United States Patent [19]

Ooe et al.

[11] Patent Number: 5,875,299
[45] Date of Patent: Feb. 23, 1999

[54] DISK ACCESS APPARATUS FOR PERFORMING A STRIDE PROCESSING OF DATA

[75] Inventors: Kazuichi Ooe; Satoshi Inano, both of Kawasaki, Japan

[73] Assignee: Fujitsu Ltd., Kawasaki, Japan

[21] Appl. No.: 339,265

[22] Filed: Nov. 10, 1994

[30] Foreign Application Priority Data

Nov. 10, 1993 [JP] Japan ................................. 5-281288
Jun. 10, 1994 [JP] Japan ................................. 6-128590

[51] Int. Cl.⁶ ........................................................ H01J 13/00
[52] U.S. Cl. ............................ 395/200.46; 395/200.31; 395/200.42; 395/200.43; 395/200.61; 395/200.62; 395/821; 711/111; 711/112
[58] Field of Search ..................... 395/200.02, 200.03, 395/200.06, 200.09, 200.12, 200.15, 200.13, 427, 439, 438, 440, 441, 457, 474, 477, 480, 200.07, 200.08, 200.2, 200.41–200.46, 200.61–200.62

[56] References Cited

U.S. PATENT DOCUMENTS

| | | | |
|---|---|---|---|
| 4,442,487 | 4/1984 | Fletcher et al. | 395/425 |
| 4,445,174 | 4/1984 | Fletcher | 395/425 |
| 4,939,636 | 7/1990 | Nakagawa et al. | 395/425 |
| 5,168,547 | 12/1992 | Miller et al. | 395/309 |
| 5,291,582 | 3/1994 | Drako et al. | 395/425 |
| 5,305,440 | 4/1994 | Morgan et al. | 395/200 |
| 5,363,498 | 11/1994 | Sakuraba et al. | 395/425 |
| 5,375,207 | 12/1994 | Blakely et al. | 395/200 |
| 5,440,687 | 8/1995 | Coleman et al. | 395/200.15 |
| 5,452,448 | 9/1995 | Sakuraba et al. | 395/600 |
| 5,493,728 | 2/1996 | Solton et al. | 395/250 |

*Primary Examiner*—Ayaz R. Sheikh
*Assistant Examiner*—Raymond N. Phan
*Attorney, Agent, or Firm*—Staas & Halsey

[57] ABSTRACT

A disk access apparatus for performing a stride processing of data is used in a parallel computer system for connecting a plurality of computers to each other through a network. The disk access apparatus comprises a first data storage unit for storing stride process object data which is an object of a data distribution or data merging operation, a stride data storing position storage unit for storing the data storing position in the first data storing unit or a pointer designating a header of a packet of the object data transmitted from another data storage unit, a second data storage unit for storing the stride object data, a stride data storing destination storage unit for storing a data storing position in the second data storage unit or a pointer designating a header of a packet to be transmitted to another computer when stride object data is included in the packet, a partial data size storage unit for storing a size of the partial data which is an object of the distribution or a merging operation, and a stride processing unit for storing the stride process object data designated by the storing content in the stride data storing position storage unit in accordance with the content stored in the stride data storing destination storage unit in a merging or distributing manner in response to a data read or write command by using the data size stored in the partial data size storage unit.

23 Claims, 34 Drawing Sheets

```
S21
┌─────────────────────────────────────┐
│ ·FILE NAME:A                        │
│ ·DISTRIBUTED INFORMATION            │
│  ·STATE                             │
│   ·THE STRIDE TO A MEMORY OR TO A NETWORK │
│   ·NUMBER OF EFFECTIVE POINTERS COUNTED │
│    FROM HEAD                        │
│   ·DESTINATION DESIGNATED BY RESPECTIVE │
│    POINTERS                         │
│   ·ONE TIME DATA SIZE:S₁, S₂...     │
│   ·COUNTER (NUMBER OF BYTES)        │
└─────────────────────────────────────┘
```

Flowchart steps:

- S22: THE DATA WITH THE DATA SIZE ARE OBTAINED FROM ADDRESS DESIGNATED BY POINTER REGISTER GROUP OF DISK APPARATUS
- S23: BY REFERRING TO STATE REGISTER, MEMORY?
  - NO → S25: HEADER IS ADDED TO FORM PACKET SO THAT PACKET IS TRANSMITTED TO NETWORK
  - YES → S24: DATA ARE WRITTEN INTO MEMORY ADDRESS DESIGNATED BY POINTER 0 REGISTER
- S26: END?
  - NO → back to S22
  - YES → END

F I G. 1 2

DISK ACCESS APPARATUS FOR PERFORMING A STRIDE PROCESSING OF DATA

BACKGROUND OF THE INVENTION

1. Field of the Invention

The present invention relates to a parallel computer system and more particularly to a storage device access system for performing access to a disk apparatus of a computer equipped with a disk apparatus from a computer system not equipped with a disk apparatus and to a storage apparatus access system for distributing and synthesizing data, when a disk apparatus is accessed in a parallel computer system comprising computers equipped with disk apparatuses and computers not equipped with disk apparatuses.

2. Description of the Related Art

In science and technology calculations, such as in graphic processing, parallel computer systems have been widely used, and most recently parallel computer systems comprising more than 1000 computers have been used.

In a parallel computer system comprising a plurality of or many computers (cells), it is inefficient from the view point of hardware and resources for all the computers to be provided with an external memory such as a magnetic disk apparatus. There are many parallel computer systems that comprise computers equipped with disk apparatuses and computers not equipped with disk apparatuses.

In these computer systems it has become necessary for the computers equipped with disk apparatuses to merge data transmitted from the plurality of other computers to store data in their disk apparatuses, and to then divide the data read from the disk apparatus into a plurality of data and send them to the plurality of other computers.

In this case, conventionally, the data transmitted through a network from a plurality of computers are stored once in a memory of a local computer, and the data stored in the memory are merged when all the data are received. They are then written into the disk apparatus in a single block. A group of data transmitted from the disk apparatus are stored once in the memory, and thereafter read and distributed from the memory and transmitted to a plurality of computers through a network.

As described above, after data are read into the memory from the disk apparatus, they are written into the memories of respective cells forming a parallel computer system, or are transmitted to the network. Therefore, there is a problem in that there is overhead in temporarily copying the data from the disk apparatus to the memory. The data received from the network are temporarily written into the memory and thereafter written into the disk apparatus in a group. This creates additional overhead in synthesizing the data in the memory. In particular, where the data are uniformly and regularly distributed to be written into memories of a plurality of cells or are to be transmitted to many cells through the network, the longitudinal lines 1, 2, 3, 4, 5 . . . of the image data are sequentially assigned to a total of nine cells, cell 1, cell 2, cell 3, cell 4, cell 5, cell 6, cell 7, cell 8, and cell 9, to write the image data into the memories of the cells or to transmit the data to the cells through the network. In this case, it is necessary to repeat the operation of writing the data into the memory of the same cell at predetermined intervals (such as every ninth time) or the operation of transmitting the data through the network to the same cell at predetermined interval. Therefore, if the data are distributed to respective cells after they are read into a memory of a particular cell from its disk apparatus as a group, considerable overhead is created. Considerable overhead is also created if, conversely, the data are written into the disk apparatus as a group after the partial data read from the memories of many cells or the partial data received via the network are all merged on the memory of the particular cell.

When the data are transmitted from a computer without a disk apparatus, namely, a cell without a disk, to a computer with a disk apparatus, namely, a cell with a disk, or data in a computer with disk apparatus are accessed by a computer without the disk apparatus so that the data are read therefrom, conventionally the computer without a disk issues a disk access request to a file server of the cell with the disk, and the file server accesses the disk and sends a response to the cell without the disk, or returns the data to the cell without the disk.

Where a cell without a disk accesses the disk apparatus of a cell with a disk, the file server operates on the side of the cell with a disk, thus delaying the execution of the user task of the cell with the disk. When the cell with the disk executes a user task with high priority, the user task issuing the disk access request on the side of the cell without the disk is kept waiting longer than necessary.

SUMMARY OF THE INVENTION

A first object of the present invention is to provide a storage apparatus access system capable of decreasing the time required to merge or distribute data and to decrease the overhead, where the data that is transmitted from a plurality of other computers are written into the disk apparatus, or conversely, a group of data read from the disk apparatus are divided and then transmitted to a plurality of computers through a network.

A second object of the present invention is to provide a storage apparatus access system capable of accessing a disk independently from an operation of software resources on a cell with a disk and capable of decreasing the time required for a disk access operation, when a cell without a disk accesses the disk apparatus of a cell with a disk through the network of a parallel computer system.

A feature of the present invention resides in a storage apparatus access system for use in a parallel computer, for connecting a plurality of computers to each other through a network. Each of the computers comprises a first data storage unit for storing stride process object data which is an object of a data distribution or data merging operation, a stride data storing position storage unit for storing the data storing position in the first data storing unit or a pointer designating a header of a packet of the object data transmitted from another data storage unit, a second data storage unit for storing the stride object data, a stride data storing destination storage unit for storing a data storing position in the second data storage unit or a pointer designating a header of a packet to be transmitted to another computer when stride object data is included in the packet, a partial data size storage unit for storing a size of the partial data which is an object of the distribution or merging operation, and a stride processing unit for storing the stride process object data designated by the storing content in the stride data storing position storage unit in accordance with the content stored in the stride data storing destination storage unit in a merging or distributing manner in response to a data read or write command by using the data size stored in the partial data size storage unit.

BRIEF DESCRIPTION OF THE DRAWING

One skilled in the art can easily understand the additional features and objects of this invention from the description of the preferred embodiments and some of the attached drawings. In the drawings:

FIG. 12 shows a flow chart of synthesizing the data by writing the data stored in the disk apparatus in a distributed manner as a group or by transferring the data stored in the disk in a distributed manner to the network as a group;

DESCRIPTION OF THE PREFERRED EMBODIMENTS

Figure 1:
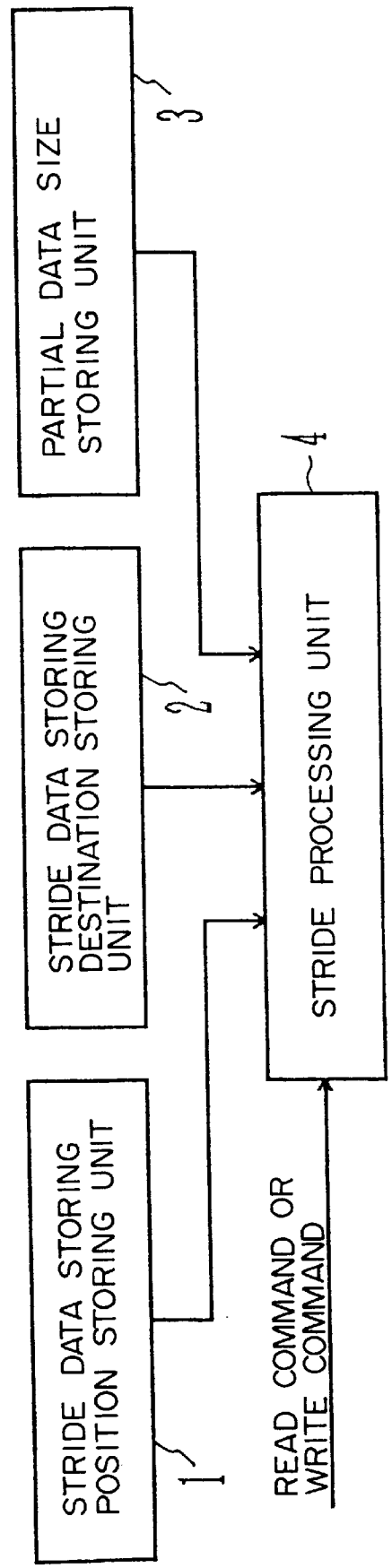
FIG. 1 shows a block diagram of a principle of the first embodiment.

FIG. 1 illustrates the principle of the first embodiment provided to achieve the first object of the present invention. In FIG. 1, in a parallel computer system in which a plurality of computers are interconnected through a network, a stride process operation is effectively carried out to merge or distribute the data input to or output from a memory apparatus such as a disk apparatus.

In FIG. 1, stride data storage position storage unit 1 stores a data storage position within a first data storage apparatus (not shown) in which the stride processing object data to be distributed or merged is stored, and also stores a pointer pointing to the header of a packet which is transmitted from the other computer and which includes the stride processing object data.

Stride data storage destination storage unit 2 stores a data storage position in a second data storage apparatus (not shown) in which the stride processing object data are to be stored, and also stores a pointer designating the header of a packet which is transmitted to the other computer and which includes the stride processing object data. Partial data size storage unit 3 stores the size of the partial data to be distributed or merged.

Stride processing unit 4 performs stride processing to store the stride process object data whose storage position is designated by the stored content of the stride data storage position storage unit 1 in accordance with a read command or write command of the data using the data size stored in partial data size storage unit 3 in accordance with the stored content in the stride data storage destination storing unit 2.

As shown in FIG. 1, the stride data storing position storage unit 1 stores the storage position of a group of data within the disk apparatus constituting the first data storage apparatus. Stride data storage destination storage unit 2 stores a plurality of pointers, designating the headers of the plurality of packets to be transmitted to the other computers after the stride processing object data are divided.

Partial data size storing unit 3 stores the size of the partial data of the distribution object to be included in the respective packets. Stride processing unit 4 distributes the group of data stored in the disk apparatus and stores them in the packets designated by the pointers stored in stride data storage destination storage unit 2 in response to a data read command. Therefore, it becomes possible to directly store the data by distributing the group of data stored in the disk apparatus into a plurality of packets to be sent to the other computers, thereby eliminating the necessity of distributing the data after they are once stored in the memory in the local computer, as in the prior art.

In the first embodiment for achieving the first object of the present invention, the first data storage apparatus comprises a disk apparatus or a memory within the local computer. The second data storage apparatus comprises a memory when the first data storing apparatus comprises a disk apparatus, and a disk apparatus when the first data storing apparatus comprises a memory. The data input and output operation between the disk apparatus and the memory, or between the disk apparatus and the packet to be transmitted to or received from the other computers is performed in response to a data read command or a data write command. As a result of the data input and output operation, the stride processing comprising a data distribution or data synthesizing operation is performed. An embodiment of the stride operation as used in the first embodiment can be provided in various forms as described later.

Figure 2:
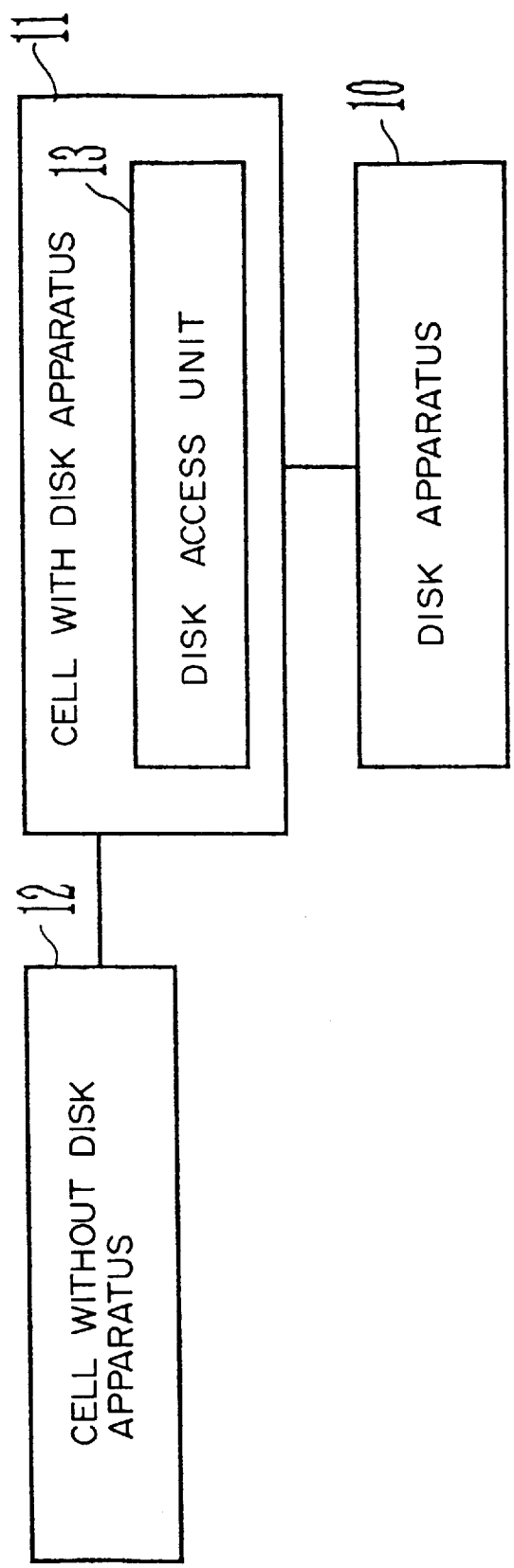
FIG. 2 shows a block diagram of the second embodiment.

FIG. 2 shows a block diagram of the second invention for achieving the second object. As shown in FIG. 2, in a parallel computer system in which a computer with a disk apparatus is connected to a computer without a disk apparatus through a network, the computer without the disk apparatus accesses the disk apparatus of the computer with the disk apparatus.

The disk access unit 13 is provided in at least one computer 11 having a disk apparatus 10, namely, a cell 11 with a disk. The disk access unit 13 carries out data transfer between the computer 12 without the disk apparatus and the disk apparatus 10 provided in the local computer without using the software resources of the local computer, in response to a receipt of a data transfer request/communication message transmitted through the network from the computer 12 without disk apparatus to the computer 11 with disk apparatus (which is the local computer).

When the data are read from the disk apparatus 10 from the cell without a disk 12 in the second embodiment, whose principle is shown in FIG. 2, the data transfer request message is transmitted to computer 11 with disk apparatus 10 through the network. The computer 11 writes the disk apparatus uses a hardware such as a disk access unit 13 to independently carry out the disk access to read the designated data from the disk apparatus 10) without using the software resources of the local computer 11, and transmits the responses to the above data transfer request message to the computer 12 without the disk. Therefore, the disk access operation is carried out without affecting the process of the user task operating on the side of the computer 11 with the disk apparatus.

The efficiency of the storage apparatus access, such as disk access in a parallel computer system, is increased. The process of data distribution and synthesization can be conducted at high speed between the disk apparatus and memory between two cells in the network. The cell without disk accesses the disk apparatus of the cell with disk, and independent disk access is made possible without delaying execution of the task operating of the cell with disk and by using the software resources on the side of the cell with disk, thereby contributing to the speed of the disk access process in a parallel computer system.

Figure 3:
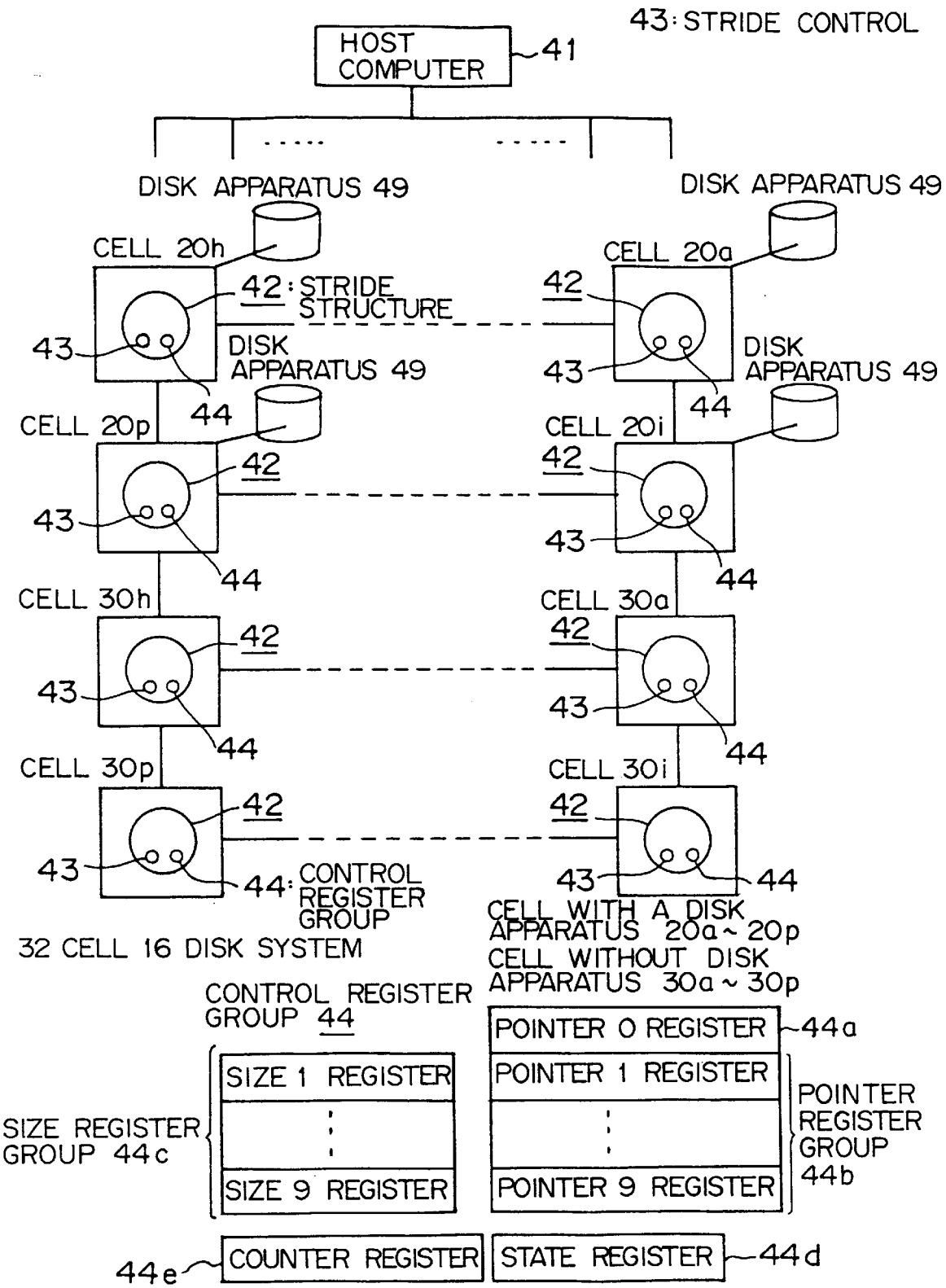
FIG. 3 shows a block diagram designating an entire structure of a parallel computer system in the first embodiment.

The first embodiment for realizing the first object of the present invention, namely, the data stride processing for reading a group of data from the disk apparatus and distributing them for transmission to the other plurality of computers, is described in more detail. FIG. 3 is a block diagram showing the overall configuration of a parallel computer system used in the first embodiment.

The host computer 41 controls the whole system. Cells 20*a* to 20*p* are equipped with disk apparatuses. Cells 30*a* to 30*p* are not connected to a disk apparatus. The cells 20*a* to 30*p* perform parallel computer processing. Respective cells are provided with server stride structure 42.

Server stride structure 42 performs data input and output operations and comprises a stride control 43 and a register group 44.

Stride structure 42 divides or merges the data of the disk apparatus to write them into the memory directly, to transmit them to the network directly, or to merge or divide the data stored in the memory or received from the network to write them into the disk apparatus directly, in response to the issuance of read/write commands, and in accordance with the contents set in control register group 44.

Control register group 44 comprises register 44*a* for storing a pointer 0 designating the head of the merged data; pointer register group 44*b* designating the memory area for storing the partial data and the packet header; size register group 44*c* for setting the size of the partial data in response to the content of the pointer register group 44*b*; state register 44*d* for storing the distribution information as to which is designated by the pointer register group 44*b* or pointer 0 register 44*a*; disk apparatuses; memories; the network; and counter register 44*e*, in which the total number of bytes of merged data is set.

The first embodiment provides a first example of operation. As the first example, in response to an issuance of a read command for reading the data from the disk apparatus, the stride structure 42 obtains the partial data of the size determined by the size register group 44*c* from the head of the data of the group of the disk apparatus designated by the pointer 0 register 44*a* and directly writes it into the memory regions designated by the pointer register group 44*b* for forming a packet in which the partial data are added to the header designated by the pointer register group 44*b* to directly transmit them to the network to distribute them. This operation is repeated until the process for a group of data is completed.

As the second example, in response to an issuance of a read command for reading the data from the disk apparatus, the stride structure 42 obtains the partial data of the size determined by the size register group 44*c* from the head of the data of the group of the disk apparatus designated by the pointer 0 register 44*a* and directly writes them into the memory regions designated by the pointer register group 44*b* for forming a packet in which the partial data are added to the header designated by the pointer register group 44*b* to directly transmit them to the network to distribute them. This operation is repeated until the process for a group of data is completed.

As the third example, in response to an issuance of a read command for reading the data from the disk apparatus, the stride structure 42 obtains the partial data of the size determined by the size register group 44*c* from the head of the data of the group of the disk apparatus designated by the pointer 0 register 44a and directly writes them into the memory regions designated by the pointer register group 44b for forming a packet in which the partial data are added to the header designated by the pointer register group 44b to directly transmit them to the network to distribute them. This operation is repeated until the process for a group of data is completed.

As the fourth example, in response to an issuance of a read command for reading the data from the disk apparatus, the stride structure 42 obtains the partial data of the size determined by the size register group 44c from the head of the data of the group of the disk apparatus designated by the pointer 0 register 44a and directly writes them into the memory regions designated by the pointer register group 44b for forming a packet in which the partial data are added to the header designated by the pointer register group 44b to directly transmit them to the network to distribute them. This operation is repeated until the process for a group of data is completed.

The state register 44d is provided for storing the distribution data designating which among the disk apparatus, memory or header is designated by the pointer register group 44b and pointer 0 register 44a. Stride control 43 carries out one of the above processes by referring to state register 44d in response to the issuance of the read command or write command.

The pointer 0 register 44a for designating the head of the merged data in the disk apparatus memory or the network, pointer register group 44b for designating the distribution destination, and size register group 44c for determining the size of the partial data are provided. Based on the settings of these registers, the data are directly merged or directly distributed between the disk apparatus and the network, for example, thereby decreasing the overhead caused by the conventional distribution and synthesizing operation performed on the memory and increasing the processing speed.

Figure 4:
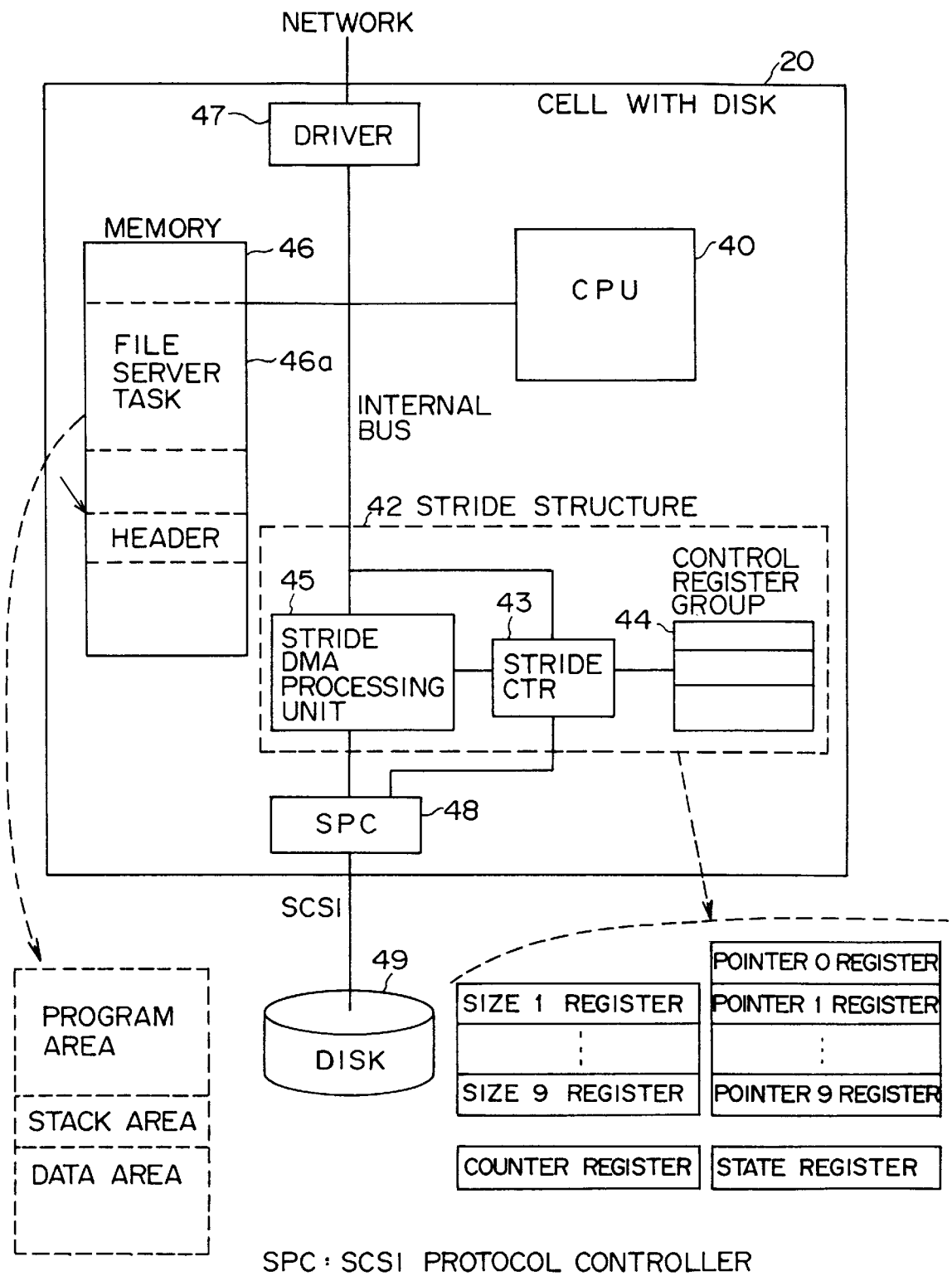
FIG. 4 shows a block diagram designating a structure of a cell with disk and a cell without disk.

FIG. 4 shows a block diagram of the detailed structure of cell 20 with disk according to the first embodiment. Cell 20 represents one of the cells 20a through 20p shown in FIG. 3, namely, a cell to which a disk apparatus is connected. Cell 20 comprises central processing unit (CPU) 40, stride structure 42, memory 46, driver 47 for use in transmitting a packet through a network and SPC 48 operating as a disk interface. SPC 48 comprises a small computer system interface (SCSI) protocol controller.

Stride structure 42 comprises stride DMA processing unit 45 for performing DMA operations in addition to the above recited stride controller 43 and control register group 44. Stride controller 43 comprises a logic circuit for realizing the logic expressed by the flow chart shown after FIG. 5. The stride controller 43 performs control such that, by referring to the content of control register group 44, stride DMA processing unit 45 divides and develops a group of data onto a plurality of areas of memory 46 and the header is attached to the divided data to start driver 47 and the packet is transmitted to the network in accordance with the operation of stride controller 43.

File server task 46a is stored in memory 46 as a system task. File server task 46a serves such that stride structure 42 operates as a driver for realizing a complex access to the disk or to the network driver. More concretely, file server 46a interprets the request given by the user and converts the request into a low level command to provide the command to stride structure 42. Stride structure 42 accesses disk 49 in accordance with the designated parameters and transmits the data to memory 46 or to the network. At this time, stride DMA processing unit 45 accesses SPC 48 as the interface and obtains the data.

Read timing and write timing will be explained in detail with regard to the grouped data in the disk apparatus and the partial data distributed into the memory and the network using the structure shown in FIGS. 3 and 4 by referring to FIGS. 5 to 11.

Figure 5:
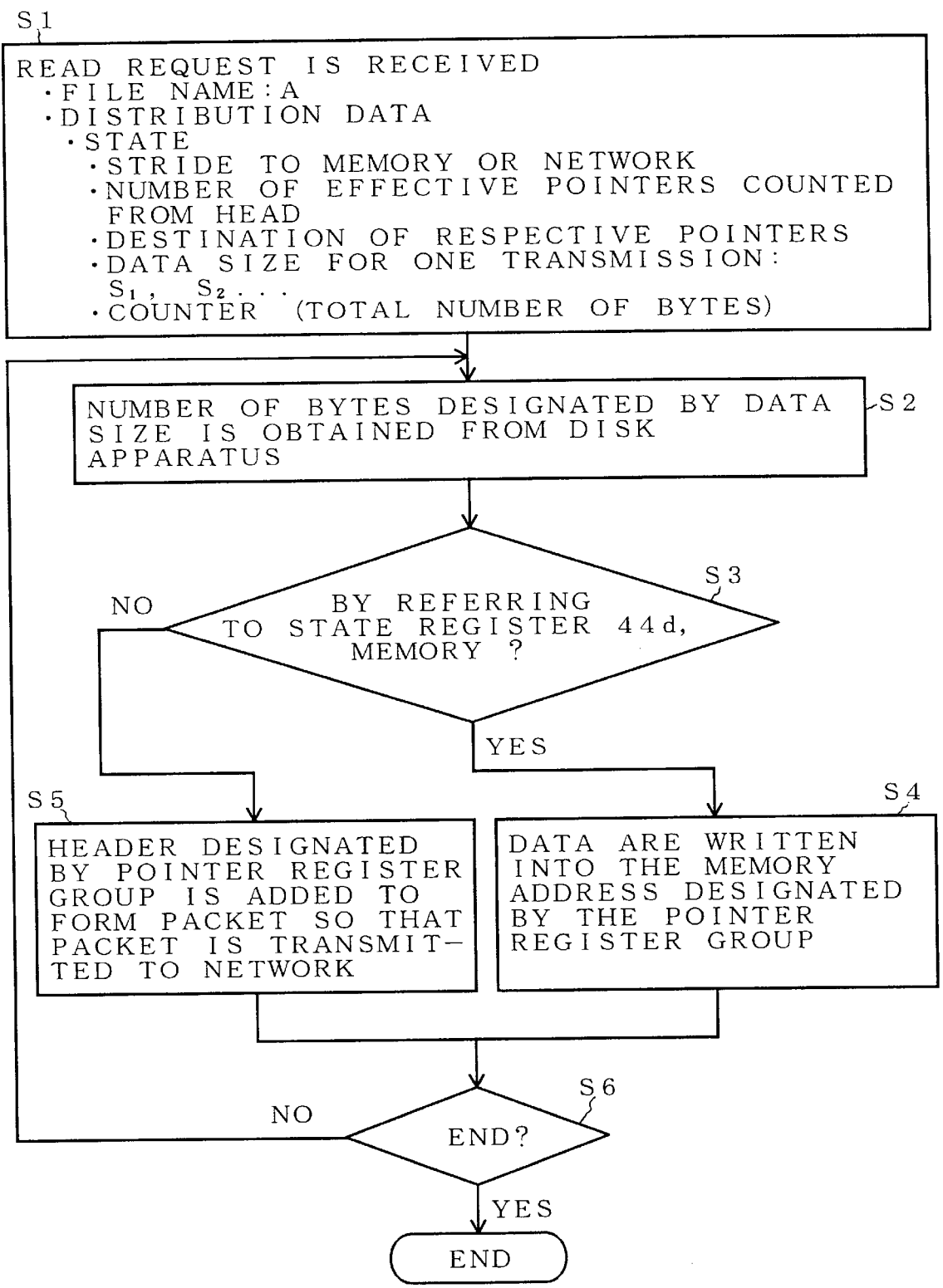
FIG. 5 shows a flow chart of a distribution of a process of the data stored in the disk apparatus.

FIG. 5 shows a flow chart of distribution processing of grouped data within the disk apparatus.

At S1, the read request is received. At this time, the following parameters are defined.

File name: A

Distribution data

State

The stride to the memory or network

Number of effective pointers counted from the head

The destination of respective pointers

The data size for one transmission: s1, s2 . . .

Counter (the total number of bytes)

The file name "A" represents the name of the file within the disk apparatus which is the object of the read operation.

"Stride to the memory or the network" in "state" in "distribution data" represents whether the data (file A) read from the disk apparatus is written into the memory or transmitted to the network after it is divided.

"Number of effective pointers from the head" in "state" represents the number of effective pointers in the pointer 0 register 44a and pointer register group 44b.

"The destination of respective pointers" in "state" represents which of the disk apparatus, memory or network is designated by the pointer 0 register 44a and pointer register group 44b.

"The data size for one transmission timing" in "distribution information" represents the data size for one transmission timing, which is obtained by dividing the merged data, and determines the data size for the pointer number within the pointer register group 44b and provides it to the size register group 44c.

"Counter (the total number of bytes)" of the distribution information represents the total number of bytes of merged data.

At step S1, file server task 46a sets control register group 44 and starts stride structure 42. The role of file server task 46a is completed when file server task 46a performs the initial setting of the parameter for the stride structure to the hardware.

At S2, the number of bytes designated by the data size is obtained from the disk apparatus. "The data size for one transmission timing" (the data size provided in the size register group 44c) is obtained from the head (the region designated by the point register 44a) of file A of the disk apparatus which received the read request.

In step S2, SPC48 shown in FIG. 4 reads the designated data from disk apparatus 49 to provide the data to stride DMA processing unit 45, or writes the data transferred from stride DMA processing unit 45 into the area designated by disk apparatus 49.

At S3, it is determined whether the destination at which the distributed data are stored is the memory, by referring to state register 44d.

If the answer is YES, it is determined that the distributed data are written into the memory and at S4, the partial data obtained at step S2 are written into the memory address designated by the pointer register group 44b. If the answer is NO, it is determined that the data are transmitted to the network. At S5, the header designated by the pointer register group 44b is added to the partial data to form a packet so that the packet is transmitted to the network. As described above, the header may be added to the respective partial data to form a packet so that the packet is transmitted to the network. Alternatively, one header may be added to a plurality of partial data to form one packet so that the packet is transmitted to the network.

At S6, it is determined whether the process is completed (the total number of bytes provided in the counter register 44e is freely obtained). If the answer is YES, all the data are divided to be written in the memory or to be transmitted to the network in the form of a packet, thereby completing a series of processes. If the answer is NO, the process is returned to step S2; then the operation of writing the partial data into the memory or transmitting it to the network is performed repeatedly.

As described above, in response to the data read request from the disk apparatus, it is repeated that the data designated by the disk apparatus is divided into the designated size and written into the designated memory, or that the data designated by the disk apparatus is provided with the designated header to form a packet so that the packet is transmitted to the network, thereby enabling the data to be distributed. The following explanation will be made referring to FIGS. 6 and 7 to explain a more complete example. The pointers 0, 1, and 2 used in the following explanations are as follows:

Pointer 0 represents the content of the pointer 0 register 44a.

Pointers 1 and 2 respectively represent the content of the pointer 1 register and the pointer 2 register formed by the pointer register group 44b.

The state represents the content of state register 44d.

The counter represents the content (the total number of bytes) of counter register 44e.

Figure 6:
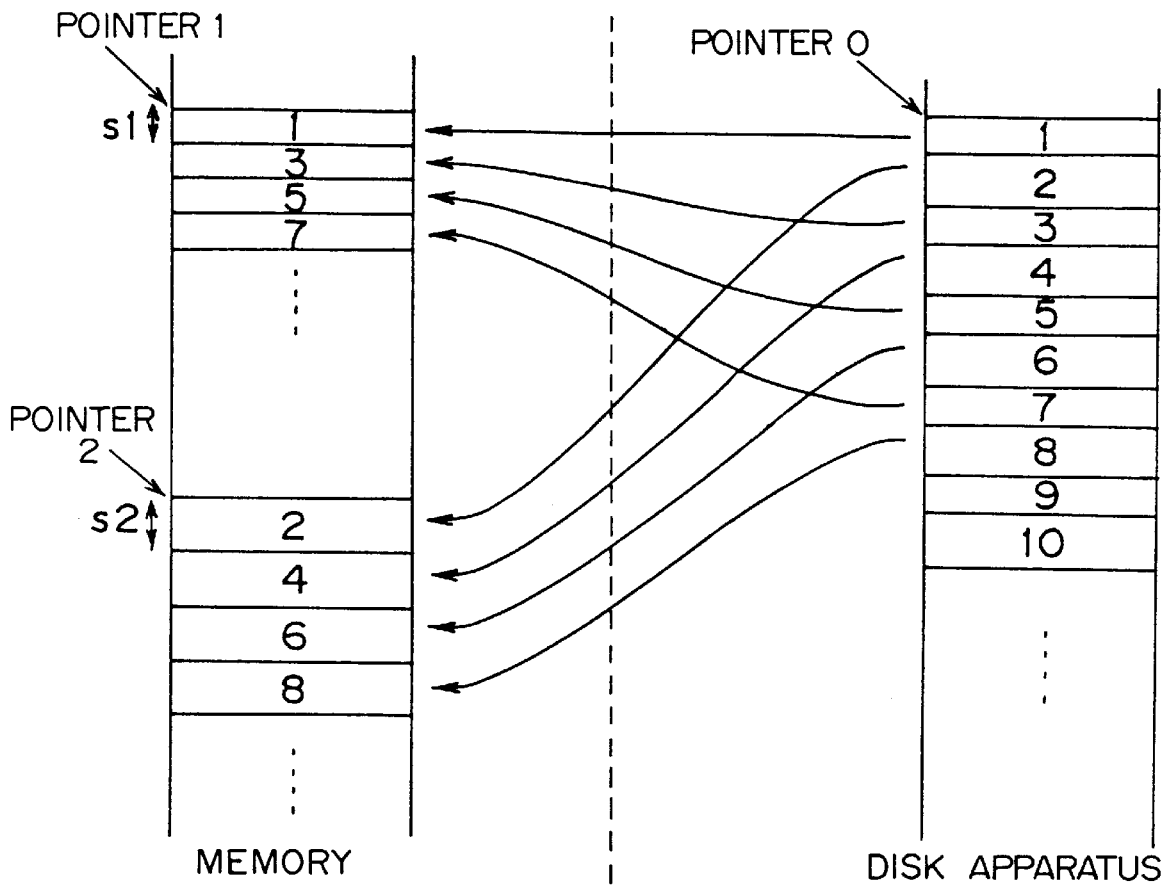
FIG. 6 shows an explanatory view of an operation of storing the distribution data into the memory, the operation being shown in FIG. 5.

FIG. 6 is a view for explaining the operation of storing the distributed data in the memory, as shown in FIG. 5. This operation corresponds to the issuance of the read command and leads to the operation of dividing the data in the disk apparatus and of directly writing the divided data into a plurality of memory regions in an interleaved manner. As shown in the drawing:

State
   The stride to the memory
   The effective pointer: 3
   Disk apparatus, memory, memory
Data size: s1, s2
Counter: Send That is, the designation of "the stride to the memory" in "state" clarifies that the destination to which the data in the disk apparatus should be distributed is the memory.

The designation by "effective pointer: 3" in "state" clarifies that the three registers from the head, that is, the pointer 0 register, pointer 1 register, and pointer 2 register in FIG. 3, are used.

The designation of "disk apparatus, memory, memory" in "state" clarifies that the pointer 0 register, pointer 1 register and pointer 2 register respectively designate the disk apparatus, the memory and the memory.

The designation of the data sizes "s1, s2" clarifies that the data sizes s1 and s2 are respectively obtained from the region of the disk apparatus designated by the pointer 0 register and are written into the memory designated by the pointer 1 and pointer 2 registers. "Send" in the counter shows a predetermined constant value.

When the process corresponding to an issuance of a read command is performed in accordance with the state, the data size, and the data of the counters, the data are written into the memory in the respective distributed manner as shown in the drawing.

First time: The partial data 1 of data size s1 are obtained from the region of the disk apparatus designated by the pointer 0 register, and is written into the memory designated by the pointer 1 register.

Second time: The partial data 2 of data size s2 are obtained from the region following the disk apparatus designated by the pointer 0 register, and is written into the memory designated by the pointer 2 register.

Third time: The partial data 3 of data size s1 are obtained from the region following the disk apparatus designated by the pointer 0 registers, and is written into the memory part following the memory designated by the pointer 1 register.

Fourth time: The partial data 4 of data size s2 are obtained from the region following the disk apparatus designated by the pointer 0, and are written into the memory portion following the memory designated by the pointer 2 register.

Fifth time and thereafter: The operations of the third and fourth times are repeated until the total number of bytes of data read from the disk apparatus reaches the counter "Send".

As described above, it becomes possible to obtain the data from the disk apparatus by dividing them and directly writing the divided data into regions of the memory, thereby distributing the data.

Figure 7:
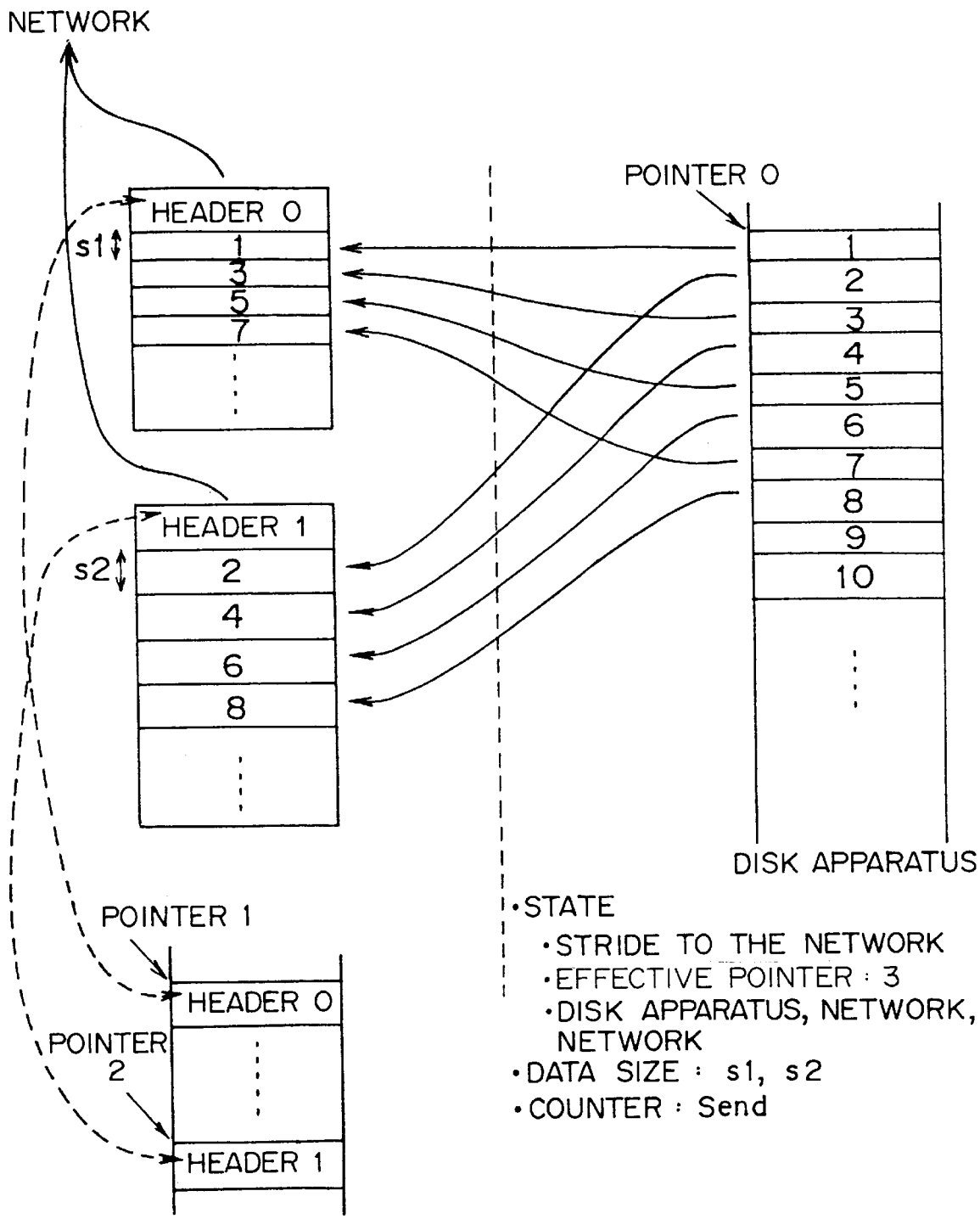
FIG. 7 shows a view of explaining an operation of transmitting the distribution data to a network, the operation being shown in FIG. 5.

FIG. 7 shows the operation of transmitting the distributed data to the network as shown in FIG. 5. In response to an issuance of the read command, the data within the disk apparatus are divided and directly transmitted to a plurality of destinations within the network.

State
   The stride to the network
   The effective pointer: 3
   Disk apparatus, network, network
Data size: s1, s2
Counter: Send Designation of the "disk apparatus, network, network" in "state" clarifies that the pointer 0 register, pointer 1 register, and pointer 2 register respectively designate the disk apparatus, network, and network.

When an operation is performed in response to an issuance of a read command in accordance with the above recited "state", "data size" and "data of the counter", the data are transmitted to a different destination of the network, as shown in the drawing.

First time: The partial data 1 of data size s1 are obtained from the disk apparatus designated by the pointer 0 register and is provided with the header 0 designated by the pointer 1 to form a packet so that the packet is transmitted to the network.

Second time: The partial data 2 of data size s2 are obtained from the region following the disk apparatus designated by the pointer 0 register and provided with header 1 designated by the pointer 2 to form a packet so that the packet is transmitted to the network.

Third time: The partial data 3 of data size s1 are obtained from the region following the disk apparatus designated by the pointer 0 and are provided with the header 0 designated by the pointer 1 to form a packet so that the packet is transmitted to the network.

Fourth time: The partial data 4 of data size s2 is obtained from the region following the disk apparatus designated by the pointer 0 and is provided with the header 1 designated by the pointer 2 to form a packet so that the packet is transmitted to the network.

Fifth time and thereafter: The operations of the third and fourth times are repeated until the total number of bytes of data read from the disk reaches the counter "Send".

As described above, the data from the disk apparatus are divided and provided with the header 0 pointer and header 1 to form a packet, and then the packet is directly transmitted to the network, thereby enabling the data to be distributed. The header may be added to each of the partial data to form a packet so that the packet is transmitted to the network. Alternatively, as shown in FIG. 7, partial data for a plurality of operations may be provided as a group with one header to form a packet so that the packet is transmitted to the network.

Figure 8:
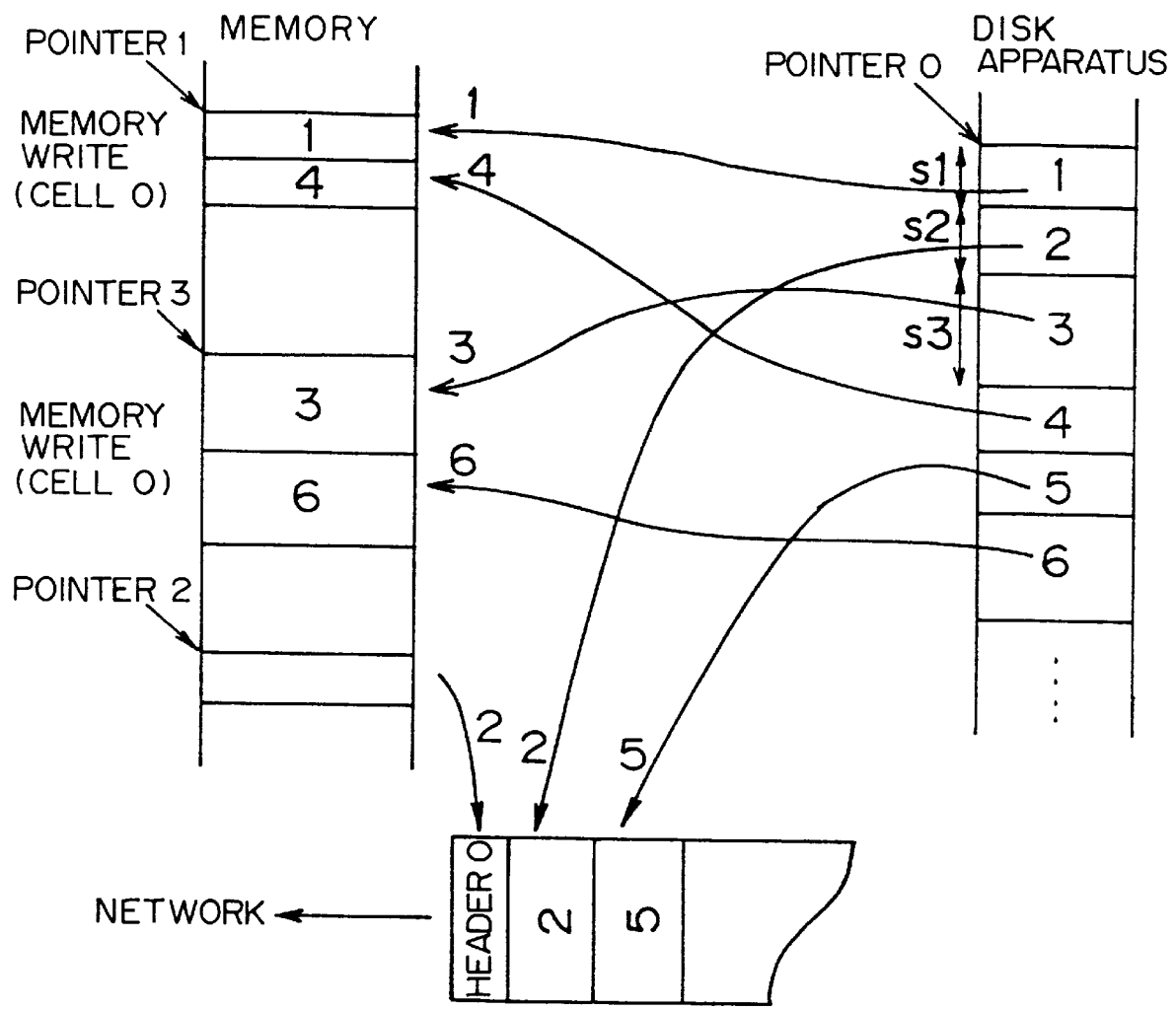
FIG. 8 shows a view of explaining an operation of storing the distribution data into the memory and transmitting the distribution data to the network, the operation being shown in FIG. 5.

FIG. 8 shows an operation of storing the distributed data in the memory and of transmitting the distributed data to the network. In response to a read command issuance, the data in the disk apparatus are divided and are directly written into the memory so that the data are transmitted to the network.

State
   The stride to memory or network
   The effective pointer: 4
   Disk apparatus, memory, network, memory
   Data size: s1, s2, s3
   Counter: Send This is different from FIG. 6 in the following points.

The designation of "disk apparatus, memory, network, and memory" in "state" clarifies that the pointer 0 register, pointer 1 register, pointer 2 register, and pointer 3 register respectively designate disk apparatus, memory, network and memory.

When a process is performed in response to an issuance of the read command in accordance with the above recited state, data size, and counter, the data may be written into the memory or transmitted to the network, thereby being distributed, as shown in the drawings.

First time: The partial data of data size s1 are obtained from the region of the disk apparatus designated by the pointer 0 and is written into the memory designated by pointer 1.

Second time: The partial data of data size s2 are read from the region following the region of the disk apparatus designated by the pointer 0 and is transmitted to the network with the header 0 attached thereto.

Third time: The partial data of data size s3 are read from the region following the region of the data size s2 in the disk apparatus and is written into the memory area designated by pointer 3.

Fourth time: The partial data of data size s4 are read from the region following the region of the data size s3 in disk apparatus and is written into the memory area designated by pointer 1.

Fifth time: The partial data of data size s5 are read from the region following the region of the data size 4 in the disk apparatus and is transmitted to the network with the header 0 attached thereto.

Sixth time: The partial data of data size s6 are read from the region following the region of the data size s5 in the disk apparatus and is written into the memory area following the memory area designated by pointer 3.

Seventh time and thereafter: The operation of the fourth through sixth times are repeated until the total number of bytes reaches the counter "Send".

As described above, it is repeated to directly write the data by obtaining the data from the disk apparatus in a divided manner and to directly transmit the packet with header 0 to the network, thereby enabling the distribution of the data. The packet prepared by adding the header 0 to the respective partial data may be transmitted to the network. The packet prepared by adding the header 0 to a plurality of partial data may be transmitted to the network.

Figure 9:
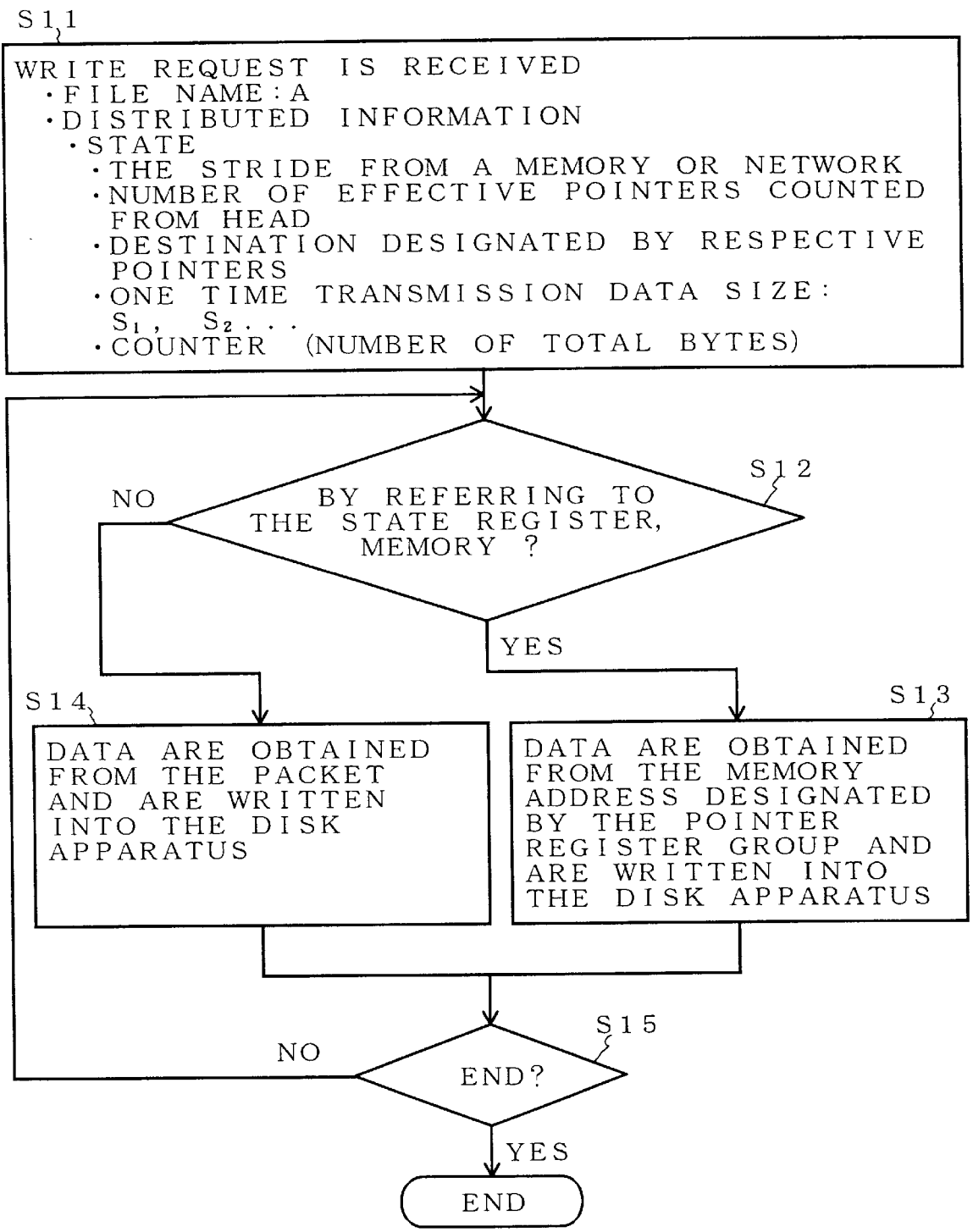
FIG. 9 shows a flow chart of synthesizing the data to be stored in the disk after completing the distribution data as a group.

FIG. 9 shows a flow chart of the data synthesizing process for storing the data to be distributed in the disk apparatus as a group.

In FIG. 9, step S11 receives a write request. At this time the following items are set as parameters.

File name: A
Distributed information
   State
      The stride from a memory or network
      The number of effective pointers counted from the head
      Destination designated by respective pointers
   One time transmission data size: s1, s2 . . .
   Counter (the number of the total bytes)

This is similar to the parameters at the time of read shown in FIG. 5. As "read time" has been changed to "write time", the meaning of the parameter is now defined as follows; for points other than those recited below it is the same as shown in FIG. 5. "The stride from a memory or a network" in "state" in the distribution information indicates that the partial data read from the memory or the partial data received from the network to be merged is written into the disk apparatus.

Step S12 determines whether the write request comes from the memory, by referring to the state register 44d. In the case of YES, it is determined that the write request comes from the memory. Therefore, at step S13, the partial data from the memory address designated by the pointer register group 44b are obtained and are written into the disk apparatus. On the other hand, in the case of NO, it is determined that the write request comes from the network. At step S14, the partial data from the packet are obtained and are written into the disk apparatus.

Step S15 determines completion of the process. (i.e., whether the process of obtaining the total numbers of the bytes set in counter register 44e is completed). In the case of YES, all the partial data are written into the disk apparatus and the series of sub-processes are completed. In the case of NO, the process returns to the step S12 and the following partial data are written into the disk apparatus, and this process is repeated in a loop.

As described above, it becomes possible to obtain the partial data with predetermined size from the memory or from the network, and to sequentially write the partial data in the designated area in the disk apparatus to be merged. A concrete example of the present invention is explained by referring to FIGS. 10 and 11.

Figure 10:
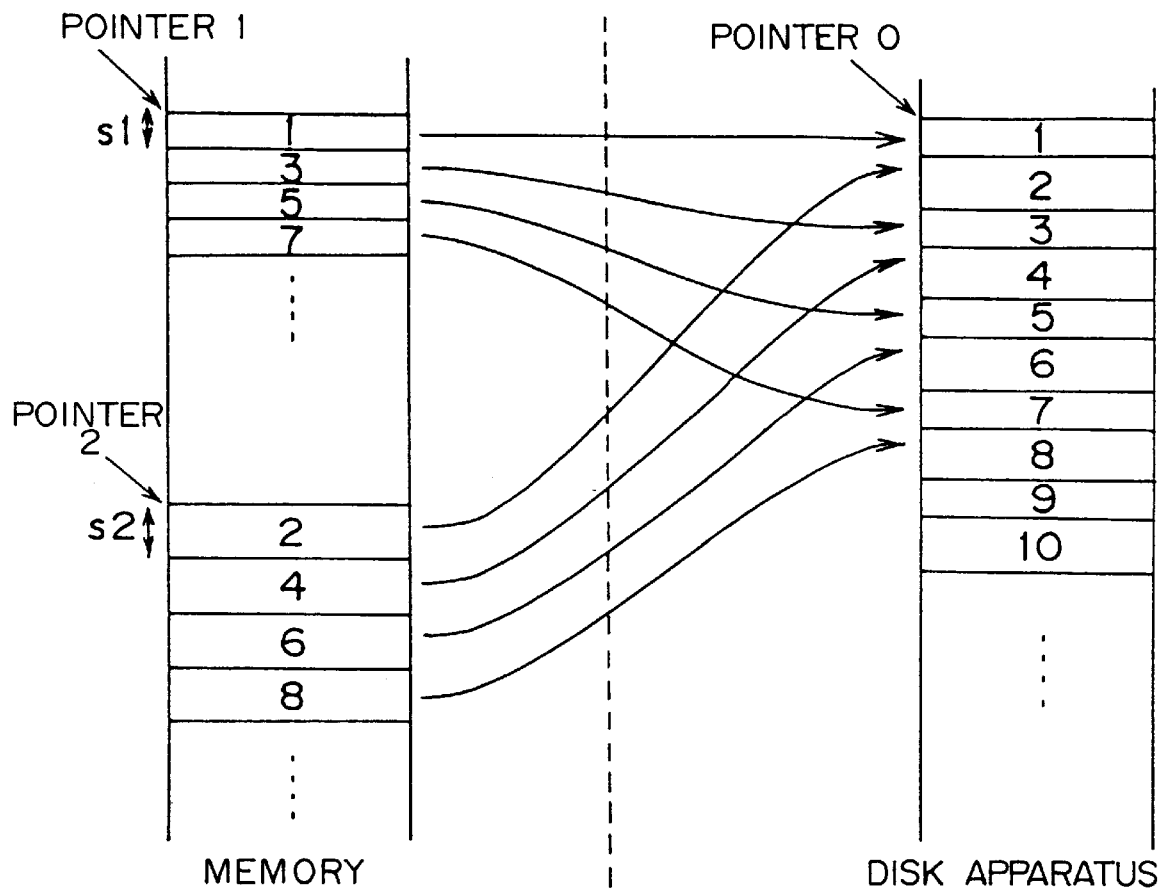
FIG. 10 shows a view of explaining an operation of storing the distribution data in the memory into the disk apparatus, the operation being shown in FIG. 9.

FIG. 10 shows the operation of storing the distribution data in the memory into the disk apparatus as shown in FIG. 9. This storage process corresponds to an issuance of a write command and sequential and direct writing of the partial data read from two memory regions into the disk apparatus so that the partial data are merged. As shown in FIG. 10:

State
   The stride from a memory
   The effective pointer: 3
   Disk apparatus, memory, memory
Data size: s1, s2
Counter: Send The parameter is set as described above and is similar to the parameters shown in FIG. 6. This parameter is for use in writing time.

The partial data from the memory are merged by a designation of "the stride from a memory" in "state".

When the process corresponding to a write command issuance is performed in accordance with the state, data size and the counter data, the partial data are directly written into the disk apparatus to be merged as shown in the drawing. More concretely:

First time: The partial data 1 with the data size S1 are obtained from the memory designated by the pointer 1, and the partial data 1 are written in the region of the disk apparatus designated by pointer 0.

Second time: The partial data 2 with the data size s2 are obtained from the memory designated by the pointer 2, and the partial data 2 are written in the following region in the disk apparatus designated by the pointer 0.

Third time: The partial data 3 with the data size s1 are obtained from the following region in the memory designated by the pointer 1, and the partial data are written in the following region of the disk apparatus designated by the pointer 0.

Fourth time: The partial data 4 with the data size s2 are obtained from the following region in the memory designated by the pointer 2, and the partial data are written in the following region of the disk apparatus designated by the pointer 0.

Fifth time and thereafter: The above third and fourth time processes are repeated until the total number of bytes counted reaches the counter "Send".

As described above, the partial data of two regions in the memory can be sequentially obtained and alternatively and directly written into the disk apparatus so that the partial data are merged.

Figure 11:
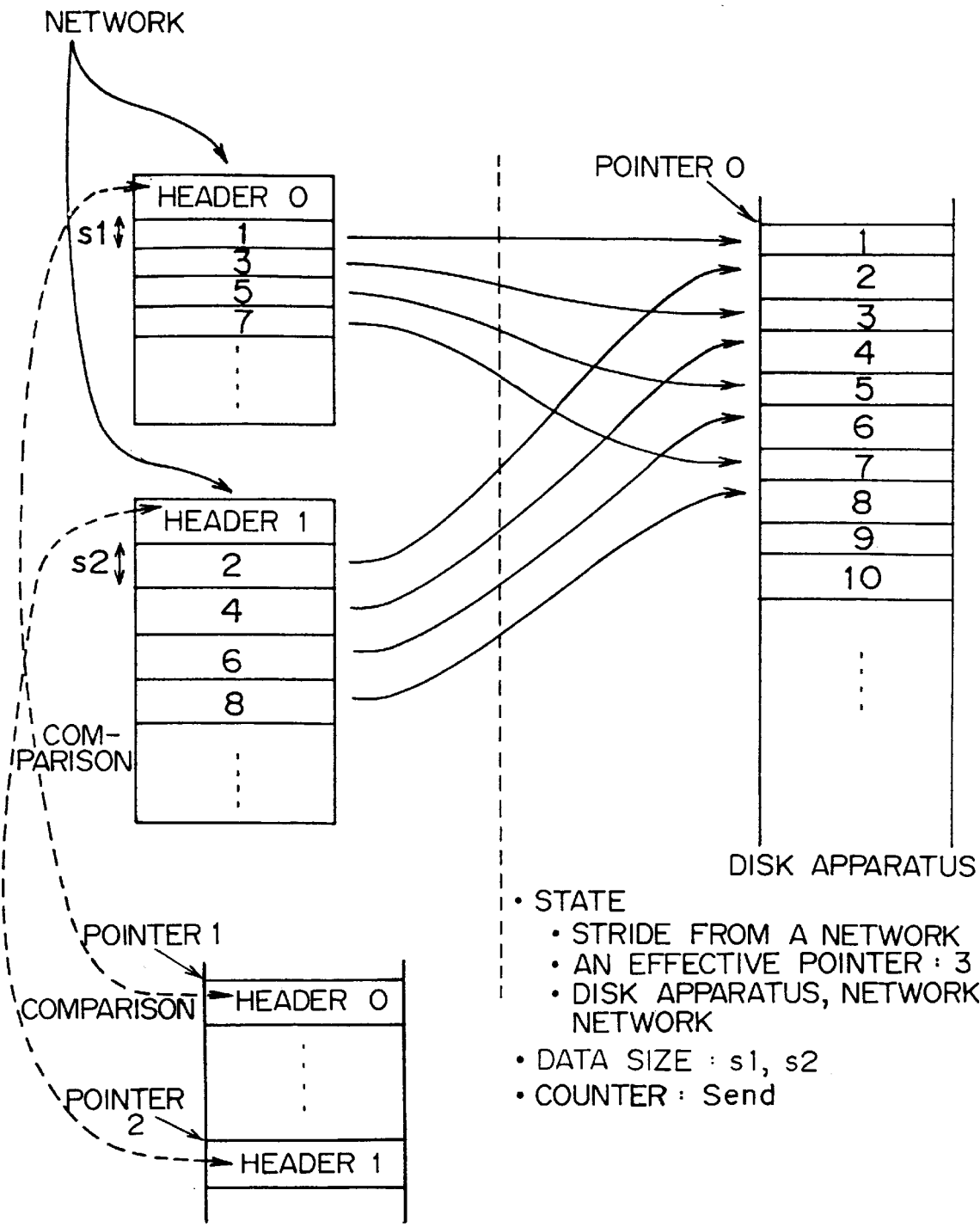
FIG. 11 shows a view of explaining an operation of storing the distribution data transmitted from the network into the disk apparatus, the operation being shown in FIG. 9.

FIG. 11 shows the process of storing the distributed data transmitted from the network shown in FIG. 9. This process corresponds to the issuance of a write command and the partial data obtained from two packets having different headers is received from the network into the disk apparatus so that the partial data are merged into completed data. As shown in FIG. 11, the parameters are set as follows.

State
  The stride from a network
  Effective pointer: 3
  Disk apparatus, network, network
Data size: s1, s2
Counter: Send "Disk apparatus, network, network" parameter in "state" is substantially different from the parameter shown in FIG. 10 and will be explained hereinafter.

It is clarified by the designation of "disk apparatus, network, network" in "state" that pointer 0 register, pointer 1 register and pointer 2 register respectively designate the disk apparatus, network and network.

When the process corresponding to write command issuance is performed in accordance with the above-described state, the data size and the data of the counter and then the partial data from the network can be directly written into the disk apparatus as shown in the drawing so that they are merged. More concretely:

First time: The partial data 1 with data size s1 are received from the received packet when the information of header 0 designated by pointer 1 accords with the header of the packet received from the network, and the partial data 1 are written in the region designated by pointer 0 in the disk apparatus.

Second time: The partial data 2 with data size s2 are obtained from the received packet when the information of header 1 designated by the pointer 2 accords with the header of the packet received from the network, and the partial data 2 are written in the following region designated by the pointer 0 in the disk apparatus.

Third time: The partial data 3 with data size s1 are obtained from the received packet when the information of header 0 designated by the pointer 1 accords with the header of the packet received from the network, and the partial data 3 are written in the following region designated by the pointer 0 in the disk apparatus.

Fourth time: The partial data 4 with data size s2 are obtained from the received packet when the information of header 1 designated by the pointer 2 accords with the header of the packet received from the network, and the partial data 4 are written in the following region designated by the pointer 0 in the disk apparatus.

Fifth time and thereafter: The process repeats the third time and fourth time processes until the count number of total bytes reaches the number "Send".

As described above, a packet whose header is matched is obtained from the network and the partial data are obtained from the packet and are alternatively and directly written into the disk apparatus so that it is merged.

Next, by referring to FIGS. 12 to FIG. 18, with the configuration shown in FIGS. 3 and 4, an operation at a data read and at a data write between the merged data in the memory or in the network and the partial data distributed in the disk apparatus is explained in more detail.

FIG. 12 shows a flow chart of synthesizing the distributed data within the disk apparatus to write the merged data into the memory or to transmit the merged data to the network.

In FIG. 12, at step S21, the read request is accepted. At this time the following parameters are set.

File name: A
Distributed information
  State
    The stride to a memory or to a network
    The number of effective pointers counted from the head
    The destination designated by respective pointers
  One time data size: s1, s2 . . .
  Counter (the total number of bytes)

"A" of the file name presents the file name of the disk apparatus which is the subject of a read operation.

"The stride into a memory or a network" in "state" in the distribution information indicates whether the partial data read from the disk apparatus are written into the memory or are transmitted to the network so that they are merged.

"The number of effective pointers counted from the head" in "state" in "distribution information" indicates the effective number of pointer 0 register 44a and pointer registers group 44b.

"The destination designated by respective pointers" in "state" in "distribution information" indicates the destination designated by pointer 0 register 44a and pointer register group 44b. The pointer register group 44b represents a region within the disk apparatus.

"Data size of first time" in the distribution information indicates the data size of first time of the divided data for preparing the merged data and sets the respective data sizes for the numbers of the pointers within the pointer register group 44b, and "the data size of first time" is set in the size register group 44c.

"Counter (the number of total bytes)" in the distribution information represents the number of total bytes of the merged data.

At step S22, the partial data with the data size is obtained from the address designated by the pointer register group 44b of the disk apparatus.

Step S23 determines by referring to the state register 44d the destination in which the merged data are stored as the memory. In the case of YES, it is clarified that the merged data are written into the memory and, at step S24, the partial data obtained at step S22 are written into the memory address designated by the pointer 0 register 44a. In the case of NO, it is clarified that the merged data are transmitted to the network. At step S25, the header designated by pointer 0 register 44a is added to the partial data to prepare the packet so that the packet is then transmitted to the network. The packet may be prepared by adding the header to the respective partial data and is transmitted to the network. The packet may be prepared by adding the header to a group of a plurality of partial data and then transmitted to the network.

At step S26, it is determined whether the process is completed (i.e. whether the total bytes set in the counter register 44e are obtained). In the case of YES, all the partial data are written into the memory or are transmitted to the network in the form of a packet, thereby completing a series of processes. In the case of NO, the process returns to step S22 and repeats the writing or transmission of the partial data cyclically.

As described above, it becomes possible to obtain the designated partial data from the disk apparatus and to directly write the partial data in the designated memory or directly transmit the packet with the designated header to the network. A concrete example is explained by referring to FIGS. 13 and 14.

Figure 13:
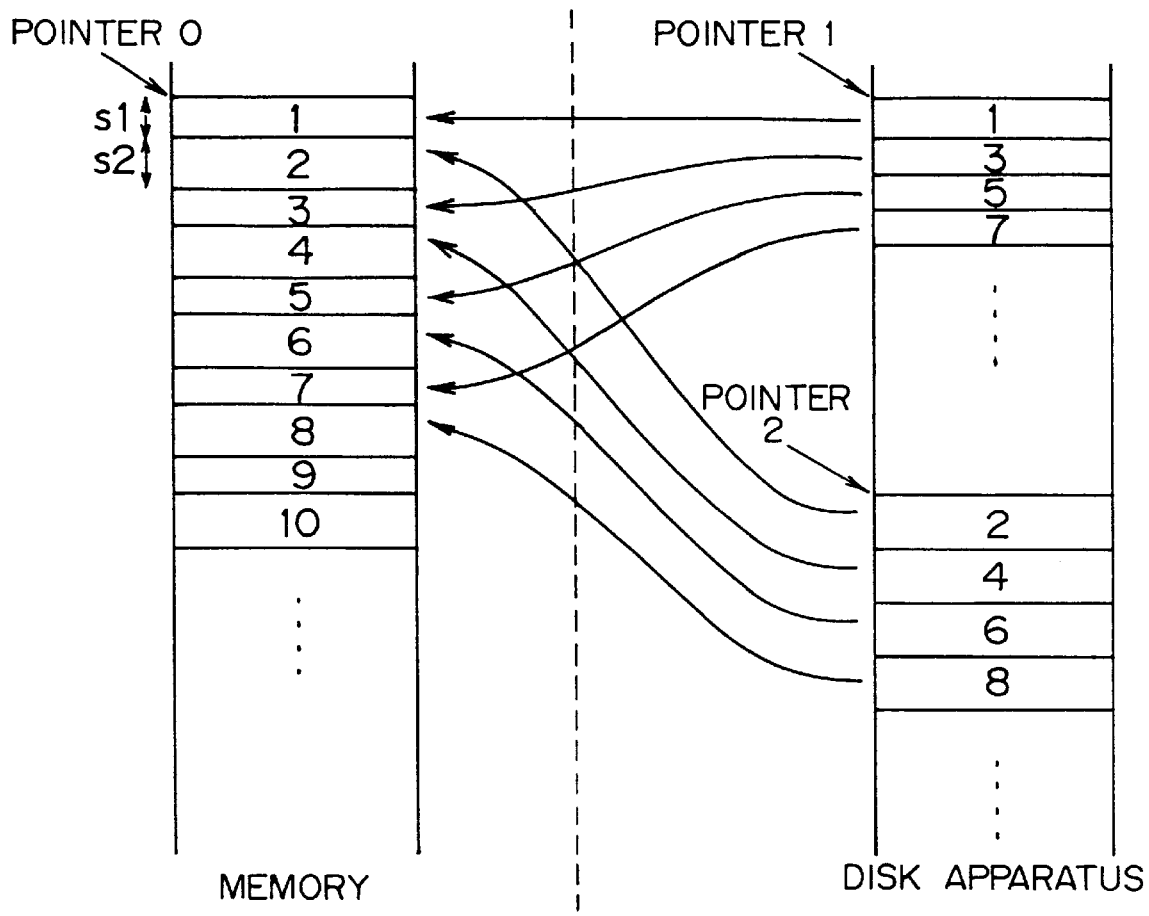
FIG. 13 shows a view of explaining an operation of storing the data into the memory, the operation shown in FIG. 12.

FIG. 13 shows the operation of storing the data into the memory shown in FIG. 12. This operation corresponds to a read command issuance and the partial data within the disk apparatus are directly written into the regions of the memory so that it is merged. The parameters are set as follows.

State
   The stride to the memory
   The effective pointer: 3
   Memory, disk apparatus, disk apparatus
Data size: s1, s2
Counter: Send When a process corresponding to read command issuance is performed in accordance with "state", data size and counter data, the partial data in the disk apparatus are directly written into the memory so that they are merged. This process is explained in more detail.

First time: The partial data 1 with data size s1 are obtained from the region designated by the pointer 1 in the disk apparatus, and are written into the memory designated by pointer 0.

Second time: The partial data 2 with data size s2 are obtained from the region designated by the pointer 2 in the disk apparatus, and are written into the following region designated by the pointer 0 in the memory.

Third time: The partial data 3 with data size s1 are obtained from the following region designated by pointer 1 in the disk apparatus, and are written into the following region designated by the pointer 0 in the memory.

Fourth time: The partial data 4 with data size s2 are obtained is obtained from the following region designated by pointer 2 in the disk apparatus, and are written into the following region designated by pointer 0 in the memory.

Fifth time and thereafter: The process repeats the third and fourth time operations until the total number of bytes reaches the counter "Send".

As described above, it becomes possible to obtain the divided partial data from the disk apparatus and to directly write them into the memory so that they are merged.

Figure 14:
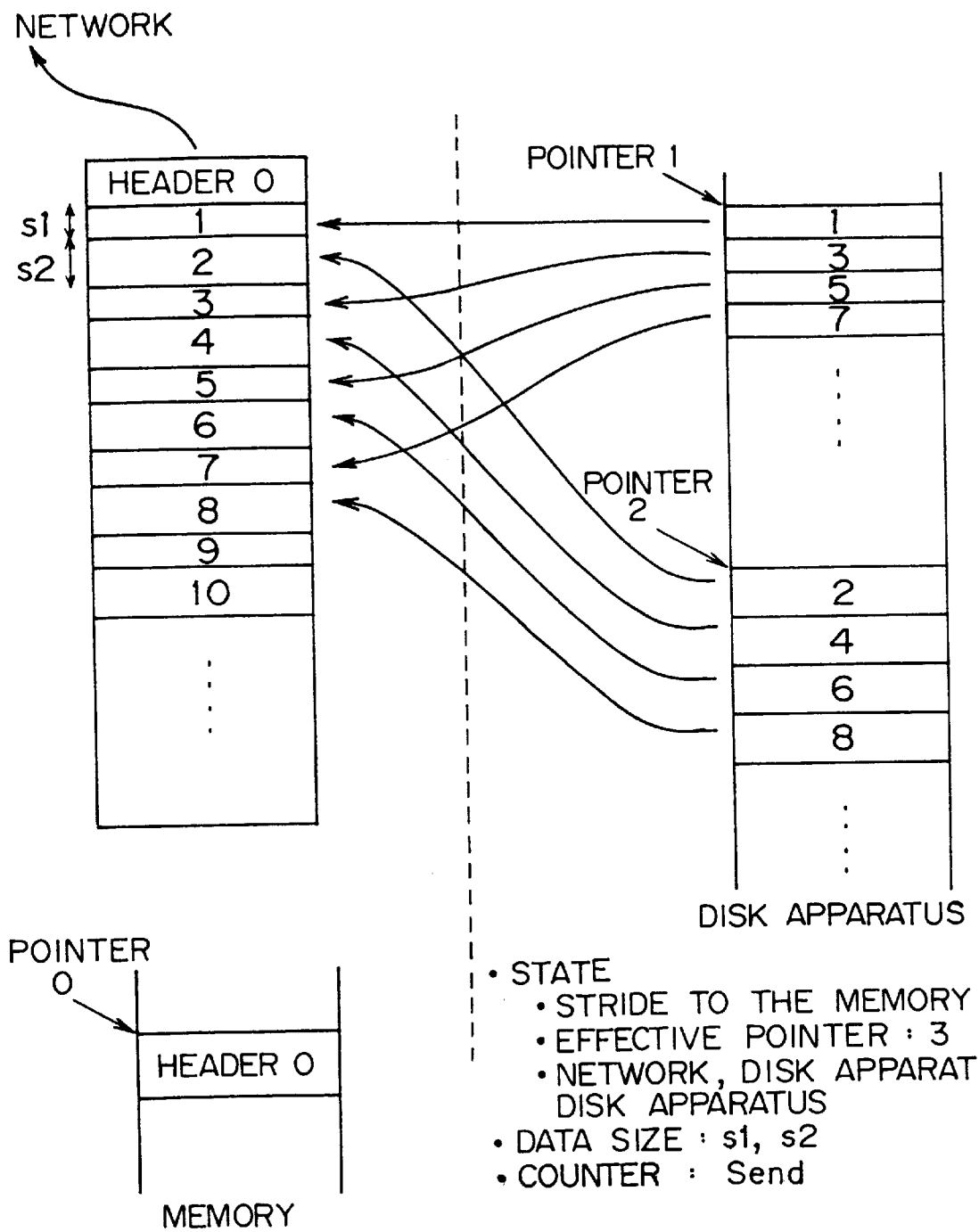
FIG. 14 shows a view of explaining an operation of transmitting the data shown in FIG. 12 into the network.

FIG. 14 shows the operation of transmitting data to the network in FIG. 12. In response to an issuance of a read command, the partial data in the disk apparatus are directly transmitted to the network so that they are merged. As shown in FIG. 14:

State
   The stride to the memory
   The effective pointer: 3
   Network, disk apparatus, disk apparatus
Data size: s1, s2
Counter: Send The parameters are set as given above.

It becomes clear from the designation of "network, disk apparatus, disk apparatus" in "state" that "pointer 0 register, pointer 1 register, pointer 2 register" respectively designate a network, disk apparatus and disk apparatus.

When the process corresponding to the issuance of the read command is performed in accordance with the above recited state, data size and counter data, the partial data in the disk apparatus is directly transmitted to the network to be merged as shown in FIG. 14. A more detailed description is as follows.

First time: Partial data 1 of the data size s1 are obtained from the area of the disk apparatus designated by the pointer 1 and the header 0 designated by the pointer 0 is added to the partial data 1 to form a packet which is to be transmitted to the network.

Second time: The partial data 2 of data size s2 are obtained from the area of the disk apparatus designated by the pointer 2, and the header 0 designated by the pointer 0 is added to the partial data 2 to form the packet which is to be transmitted to the network.

Third time: The partial data 3 of data size s1 are obtained from the following area of the disk apparatus designated by the pointer 1, and the header 0 designated by the pointer 0 is added to the partial data 3 to form the packet which is to be transmitted to the network.

Fourth time: The partial data 4 of the data size s2 are obtained from the following area of the disk apparatus designated by the pointer 2, and the header 0 designated by the pointer 0 is added to the partial data 4 to form the packet which is to be transmitted to the network.

Fifth time and thereafter: The operations of the third and fourth times are repeated until the total number of bytes reaches the counter "Send".

As described above, the partial data divided from the disk apparatus are obtained and the header is added to the partial data to form the packet which is to be directly transmitted directly to the network so that the data are merged. The packet prepared by adding the header to the respective partial data may be transmitted to the network. The partial data which are to be obtained at a plurality of timings is grouped and the header is added to the grouped partial data to form the packet which is to be transmitted to the network.

Figure 15:
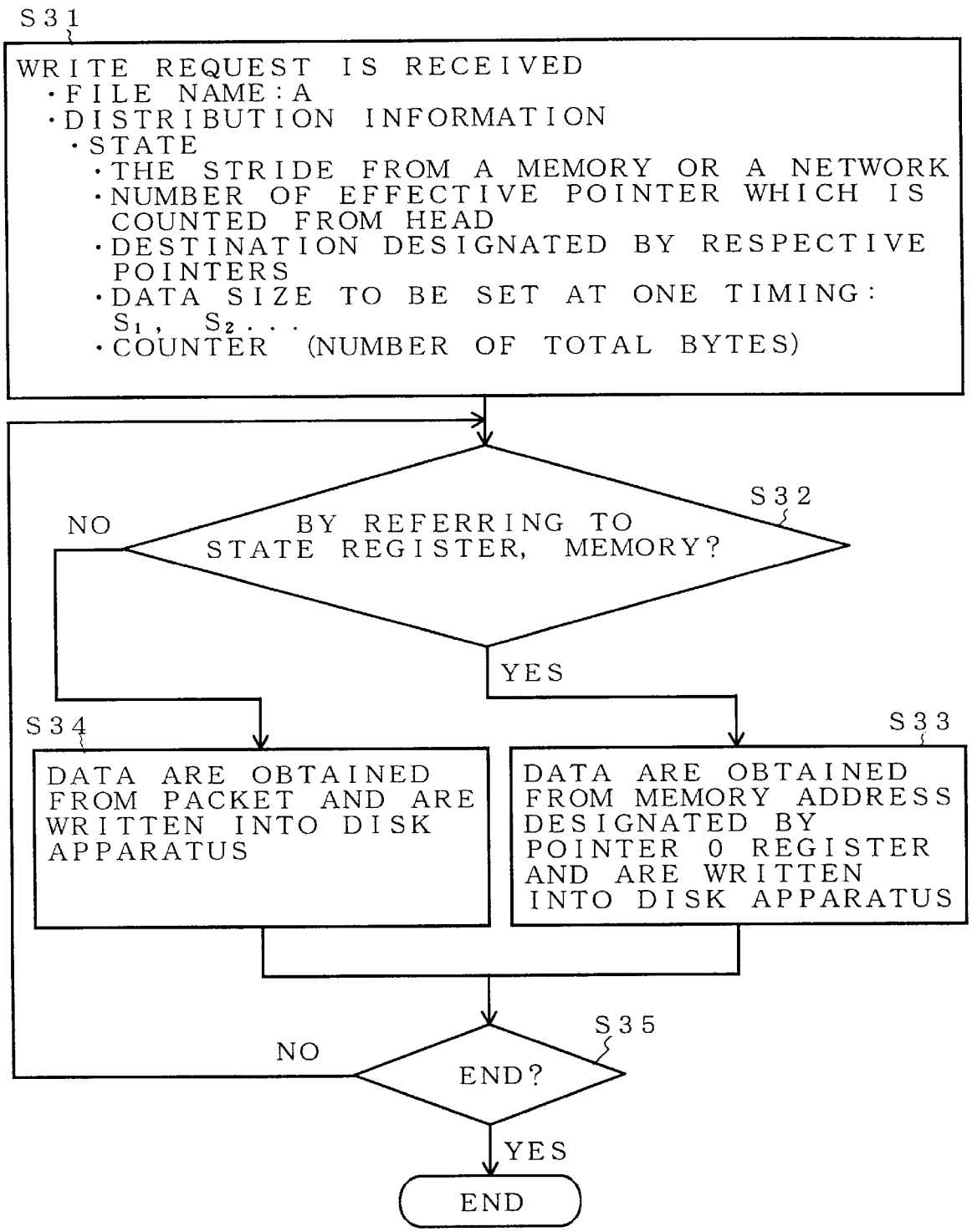
FIG. 15 shows a flow chart of the distribution process of storing the grouped data into the disk in a distributed manner.

FIG. 15 shows a flow chart of storing a group of data in a distributed manner.

In FIG. 15, the step S31 receives a write request. At this time, the following parameters are set.

File name: A

Distribution information

State

The stride from a memory or a network

The number of the effective pointer counted from the head

The destination designated by respective pointers

Data size to be set at one timing: s1, s2 . . .

Counter (the total number of bytes) The parameters are almost the same as those for read shown in FIG. 12 and thus the similar explanation is abbreviated.

At step S32, the state register 44d is referred to and it is determined whether the write request is issued from the memory. In the case of YES, it is determined that the write request is issued from the memory and thus at step S33 the data are obtained from the memory address designated by pointer 0 register 44a and are written into the disk apparatus. On the other hand, in the case of NO, it is determined that the write request is issued from the network and at step S 34 the data are obtained from the packet and are written into the disk apparatus.

At step S35, it is determined whether the process is completed, namely, whether the process of obtaining the total number of bytes set in the counter register 44e is completed. In the case of YES, all the data are written in the disk apparatus in a divided manner and the series of processes is completed. On the other hand, in the case of NO, the process returns to step S32 and the operation of writing the next partial data into the disk apparatus is repeated.

As described above, it becomes possible to obtain the partial data with the designated size from the memory or network and to directly and sequentially write the partial data into a plurality of designated areas in the disk apparatus in a distributed manner. A concrete example is explained by referring to FIGS. 16 and 17.

Figure 16:
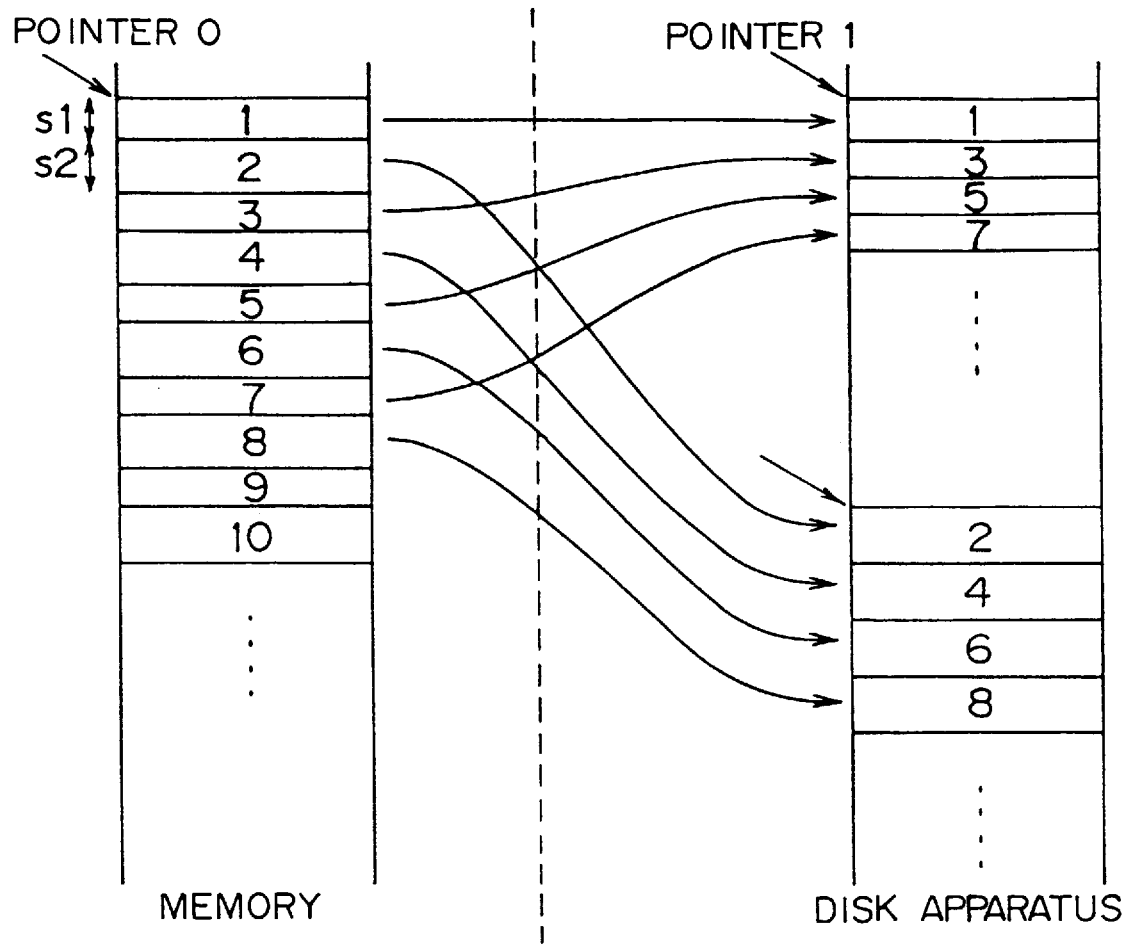
FIG. 16 shows an explanatory view of storing the data outputted from the memory, the operation being shown in FIG. 15.

FIG. 16 shows the operation of storing the data output from the memory as shown in FIG. 15. FIG. 16 shows that the data read out from the memory are divided into two regions in the disk apparatus for sequential writing in a distributed manner. The parameters are set as follows.

State

The stride from the memory

The effective pointer: 3

Memory, disk apparatus, disk apparatus

Data size: s1, s2

Counter: Send

The parameters are almost the same as those for read shown in FIG. 13.

When the process responsive to the issuance of the write command is performed in accordance with the "state" data, the data size and the counter, the data in the memory are directly written in two areas of the disk apparatus in a distributed manner. This operation is explained more in detail as follows.

First time: The partial data 1 with data size s1 are obtained from the memory designated by pointer 0 and are written into the area of the disk apparatus which is designated by pointer 1.

Second time: The partial data 2 with data size s2 are obtained from the following region of the memory designated by pointer 0, and are written into the area of the disk apparatus which is designated by pointer 2.

Third time: The partial data 3 with data size s1 are obtained from the following area of the memory designated by pointer 0, and are written into the following area of the disk apparatus which is designated by pointer 1.

Fourth time: The partial data 4 with data size s2 are obtained from the following area of the memory which is designated by pointer 0, and are written into the following area of the disk apparatus which is designated by pointer 2.

Fifth time and thereafter: The operations of the third time and fourth times are repeated until the total number of bytes reaches the counter "Send".

As described above the partial data are obtained from the memory and are alternatively written into the different areas of the disk apparatus so that the data are distributed.

Figure 17:
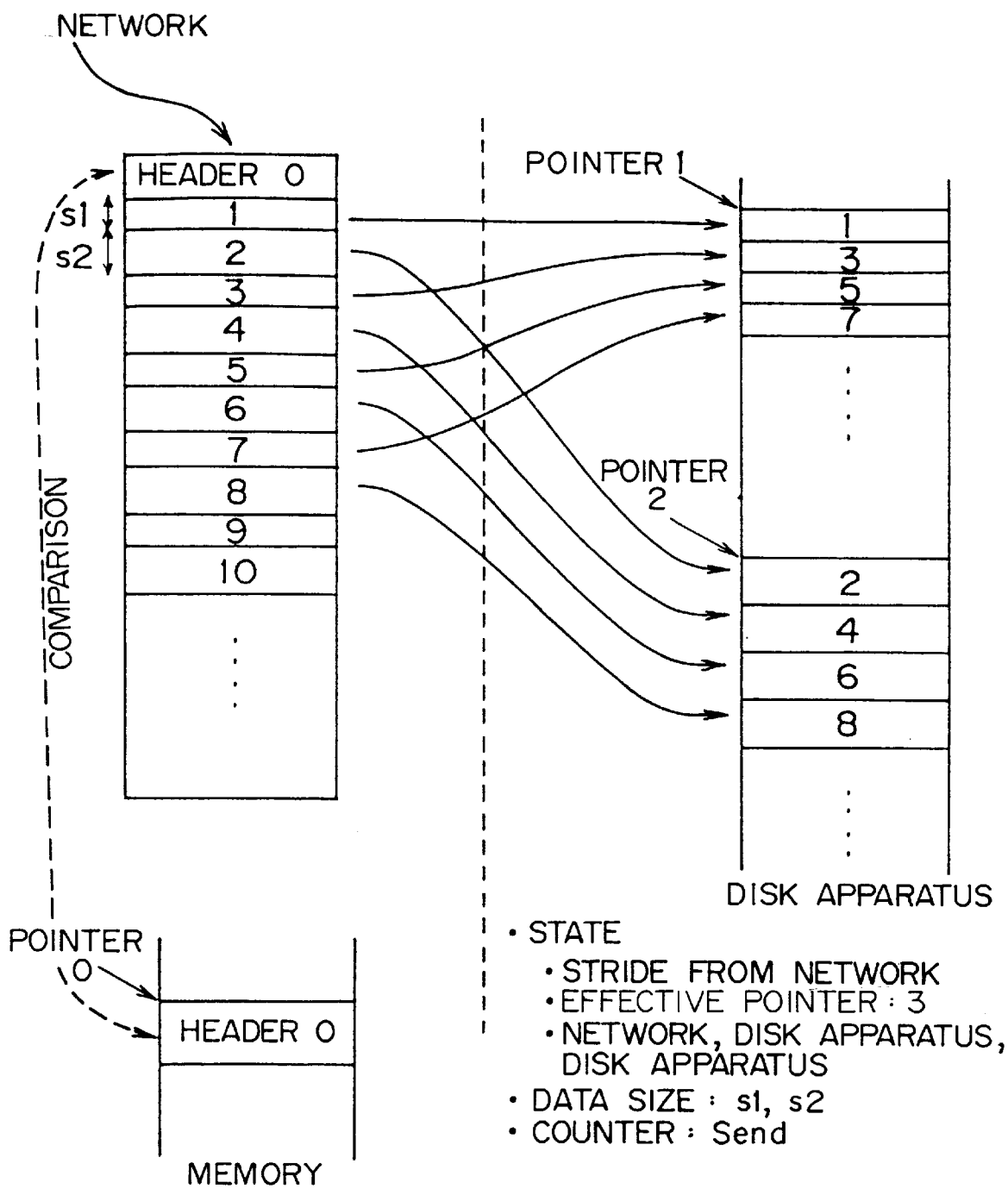
FIG. 17 shows a view of explaining an operation of storing the data transmitted from the network into the disk apparatus, the operation being shown in FIG. 15.

FIG. 17 shows the operation of storing the data from the network as shown in FIG. 15. FIG. 17 shows that the data obtained from the network are divided into two areas of the disk apparatus and are sequentially written thereinto in a distributed manner in response to an issuance of the write command. The parameters will be set as follows.

State

The stride from network

The effective pointer: 3

Network, disk apparatus, disk apparatus

Data size: s1, s2

Counter: Send

It becomes clear from the designation by "network, disk apparatus, disk apparatus" in "state" that the pointer 0 register, pointer 1 register, and pointer 2 register, respectively, point to the network, disk apparatus, and disk apparatus.

As shown in FIG. 17, the data from the network are directly written into two areas of the disk apparatus in a distributed manner when the process responsive to the issuance of the write command is performed in accordance with the parameters of state, data size, and the data in the counter. This will be explained in more detail.

First time: When the header information designated by pointer 0 accords with the header information of the packet received from the network, partial data with data size s1 are obtained from the packet and are written into the area of the disk apparatus which is designated by pointer 1.

Second time: When the header information designated by pointer 0 accords with the header information of the packet received from the network, the partial data with data size s2 are obtained from the packet and are written into the area of the disk apparatus which is designated by pointer 2.

Third time: When the header information designated by pointer 0 accords with the header information of the packet received from the network, the partial data with data size s1 are obtained from the packet and is written into the following area of the disk apparatus which is designated by pointer 1.

Fourth time: When the header information designated by pointer 0 accords with the header information of the packet which is received from the network, the partial data with the data size s2 are obtained from the packet and are written into the following area of the disk apparatus which is designated by pointer 2.

Fifth time and thereafter: The operations of the third and fourth times are repeated until the total number of bytes reach the count number "Send".

As described above, it becomes possible to obtain the partial data from the packet received from the network and directly write the partial data into two areas in the disk apparatus in a distributed manner. A single partial data may be received from a single packet from the network and may be written into the area of the disk apparatus, or a plurality of partial data may be received as a group and may be sequentially written into the area of the disk apparatus.

Figure 18:
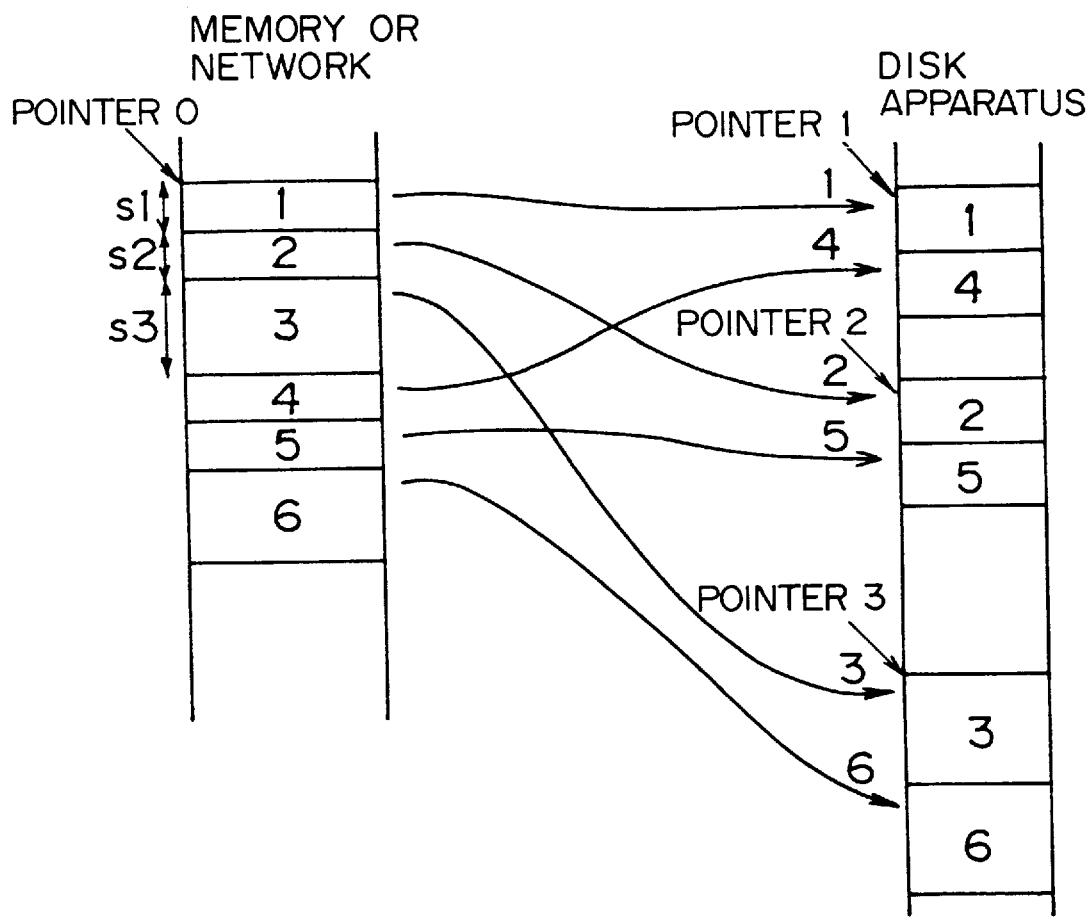
FIG. 18 shows a view of explaining an operation when the grouped data is stored in three areas of the disk apparatus in a distributed manner.

FIG. 18 shows the operation of storing the data in three areas of the disk apparatus in a distributed manner as shown in FIG. 15. FIG. 18 shows that the partial data are obtained from the memory (or network) is directly written into three areas of the disk apparatus in a distributed manner. The parameters are set as follows.

State
The stride from memory (or network)
The effective pointer: 4
Memory (or network), disk apparatus, disk apparatus, disk apparatus
Data size: s1, s2, s3
Counter: Send When the process responsive to the issuance of the write command is performed in accordance with above state, data size and data in the counter, the data from the memory (or network) are directly written into three areas of the disk apparatus in a distributed manner. The operation shown in FIG. 18 is different from that shown in FIG. 17, where the partial data are written into two areas of the disk apparatus, in that the partial data are cyclically written into the three areas of the disk apparatus in FIG. 18. Thus, the detailed operation in FIG. 18 is abbreviated.

The second embodiment of the present invention will be explained. The second embodiment corresponds to the second object of the present invention which resides in executing disk access without using a software resource on the side of the cell with disk when a computer which is not connected to a disk apparatus, namely, a cell without disk, accesses a disk apparatus with a cell within a parallel computer system through a network.

Figure 19:
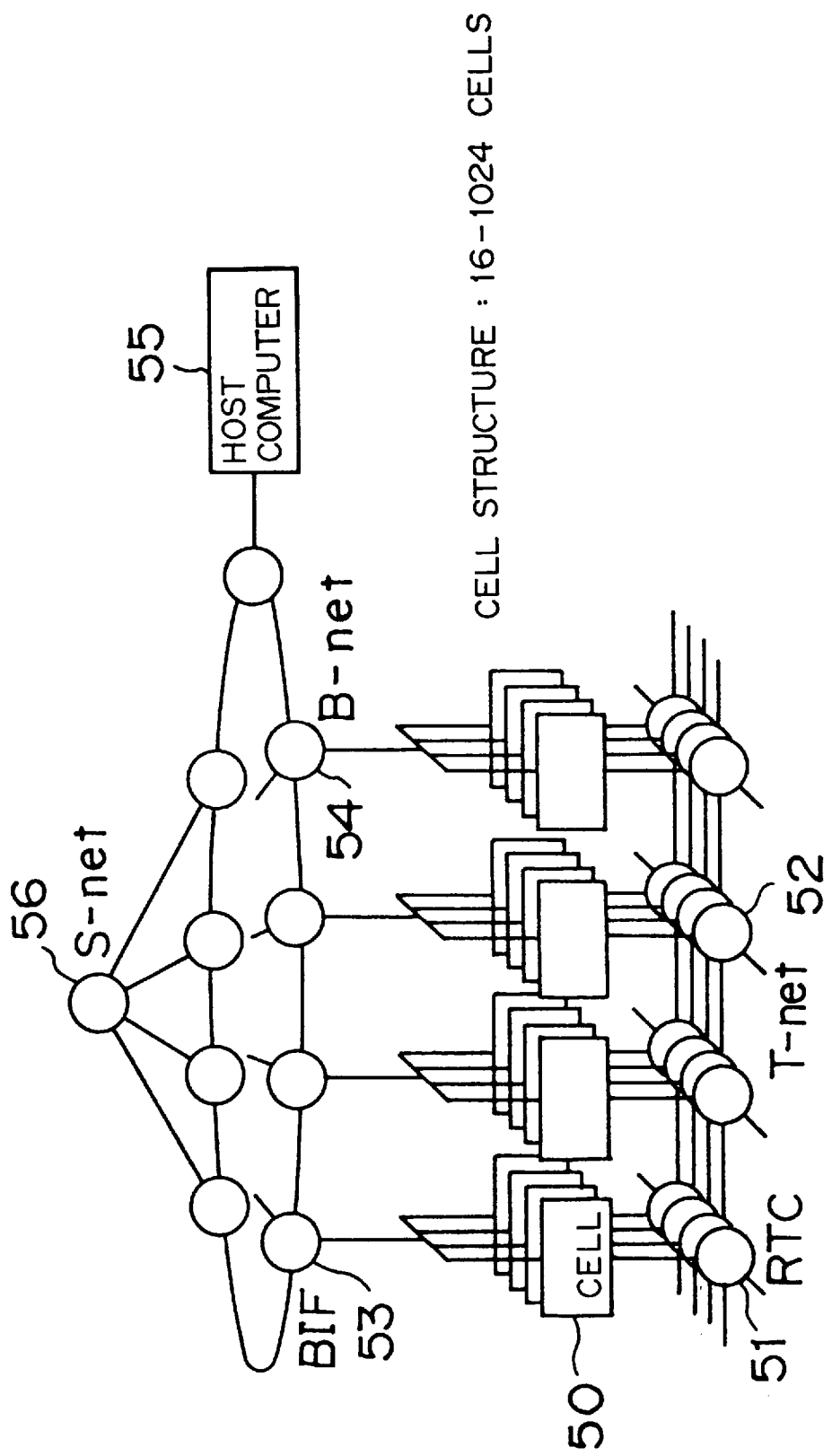
FIG. 19 shows a block diagram of an entire structure of the parallel computer system according to the second embodiment.

FIG. 19 shows a block diagram of an entire construction of a parallel computer system according to the second embodiment. In FIG. 19, a cell 50 constituting a parallel computer system is connected to a two dimensional torus (T) network 52 through routing controller (RTC) 51 and is connected to a host computer 55 through a B net 54 and a broadcast (B) interface (BIF) 53. BIF 53 is further connected to S net 56 which is used to detect barrier synchronization and a status.

Figure 20:
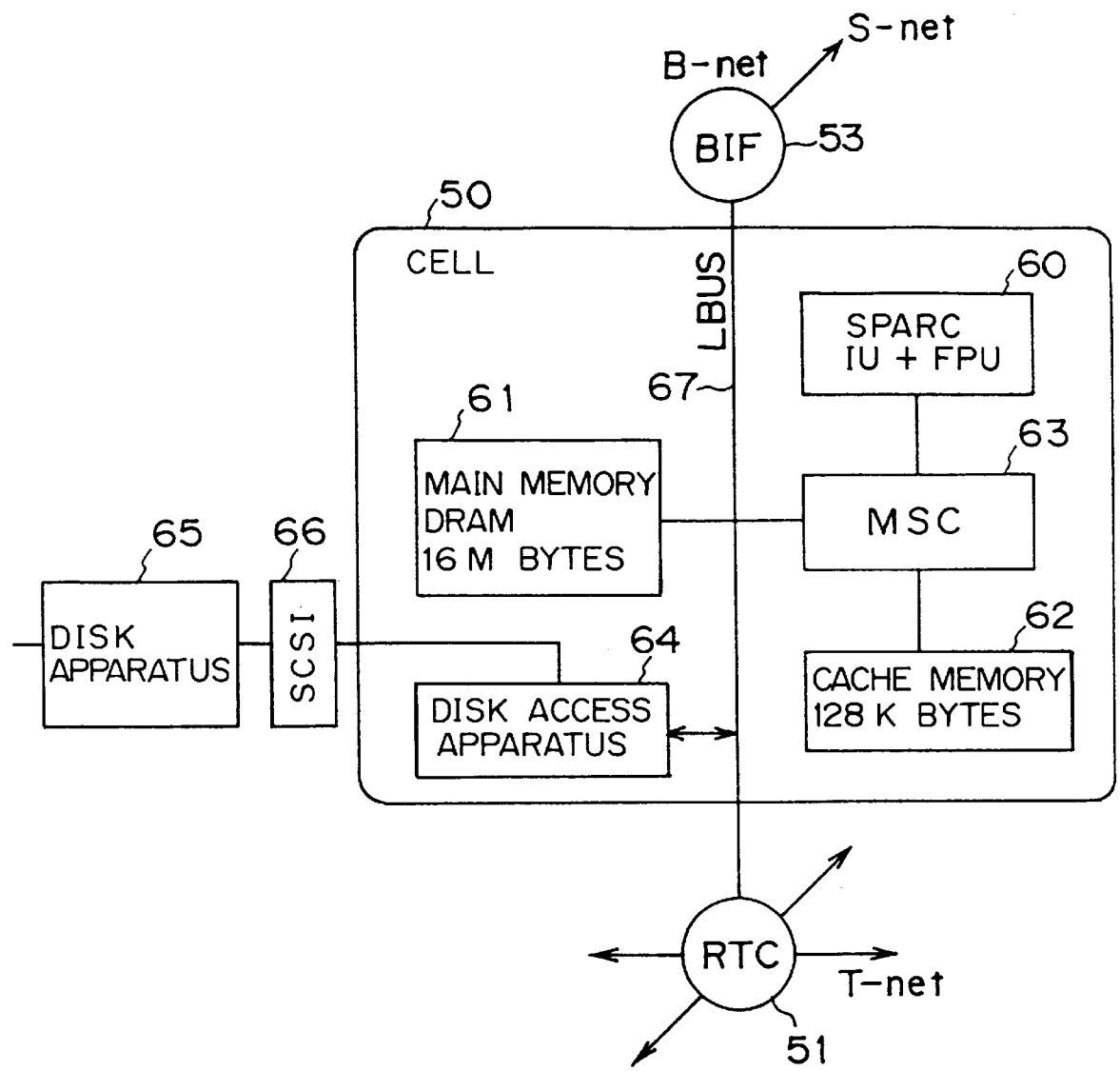
FIG. 20 shows a block diagram designating a structure of a cell with disk according to the second embodiment.

FIG. 20 shows a block diagram of the detailed structure of the cell equipped with disk shown in FIG. 19. In FIG. 19, cell 50 includes a processor (SPARC) 60 comprising an integer operation unit IU and a floating decimal operation unit FPU, main memory 61, cache memory 62, message controller (MSC) 63, a disk access structure 64 which is unique to the second embodiment, and a small computer system interface (SCSI) 66 connecting as an interface with the disk apparatus 65 and also operating as a disk driver. Further, there is a local bus (LBUS) 67 to be used for data transfer is provided within the cell.

Figure 21:
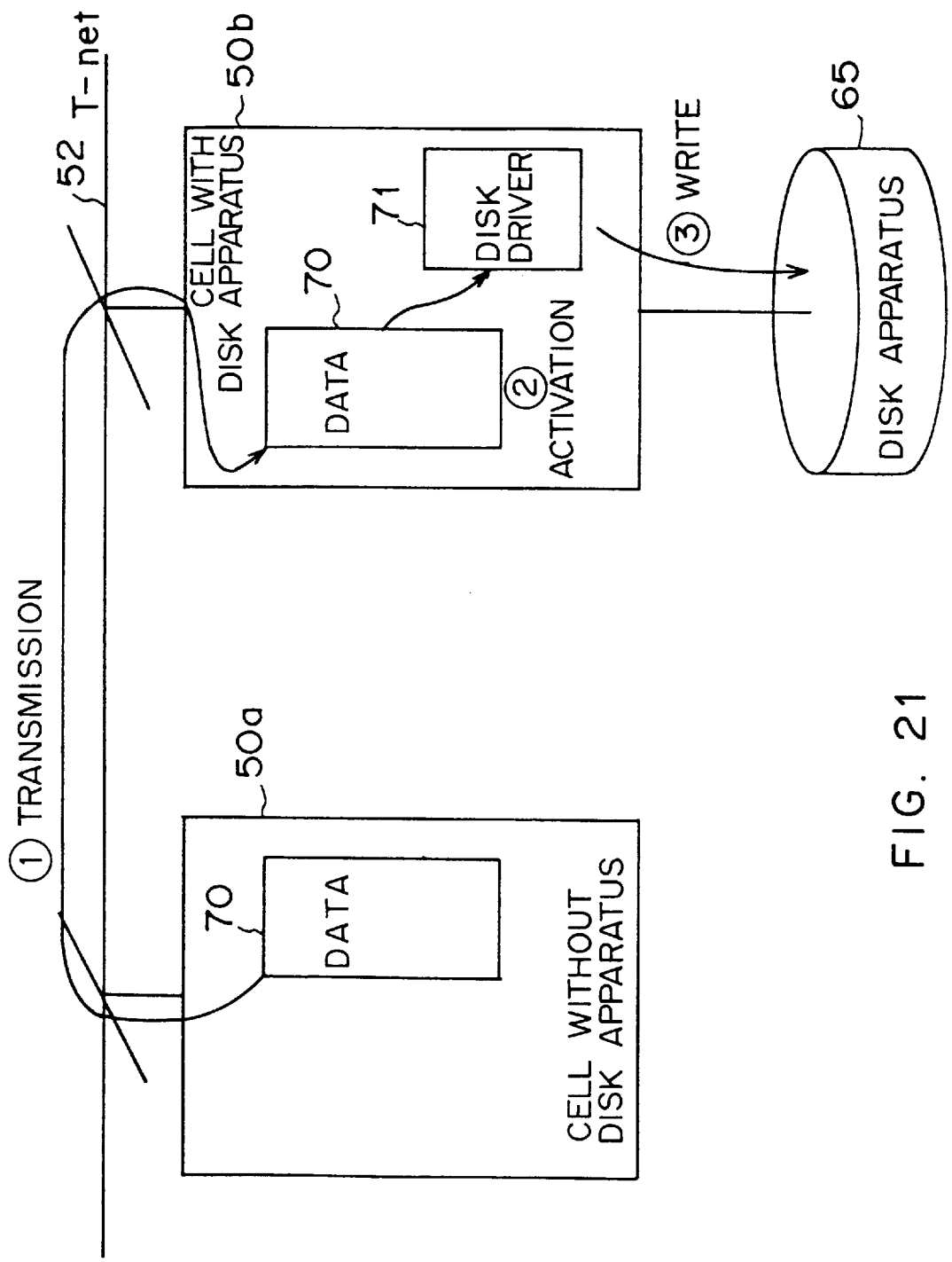
FIG. 21 shows a view (Part 1) of a summary of the disk access method according to the second embodiment.
Figure 22:
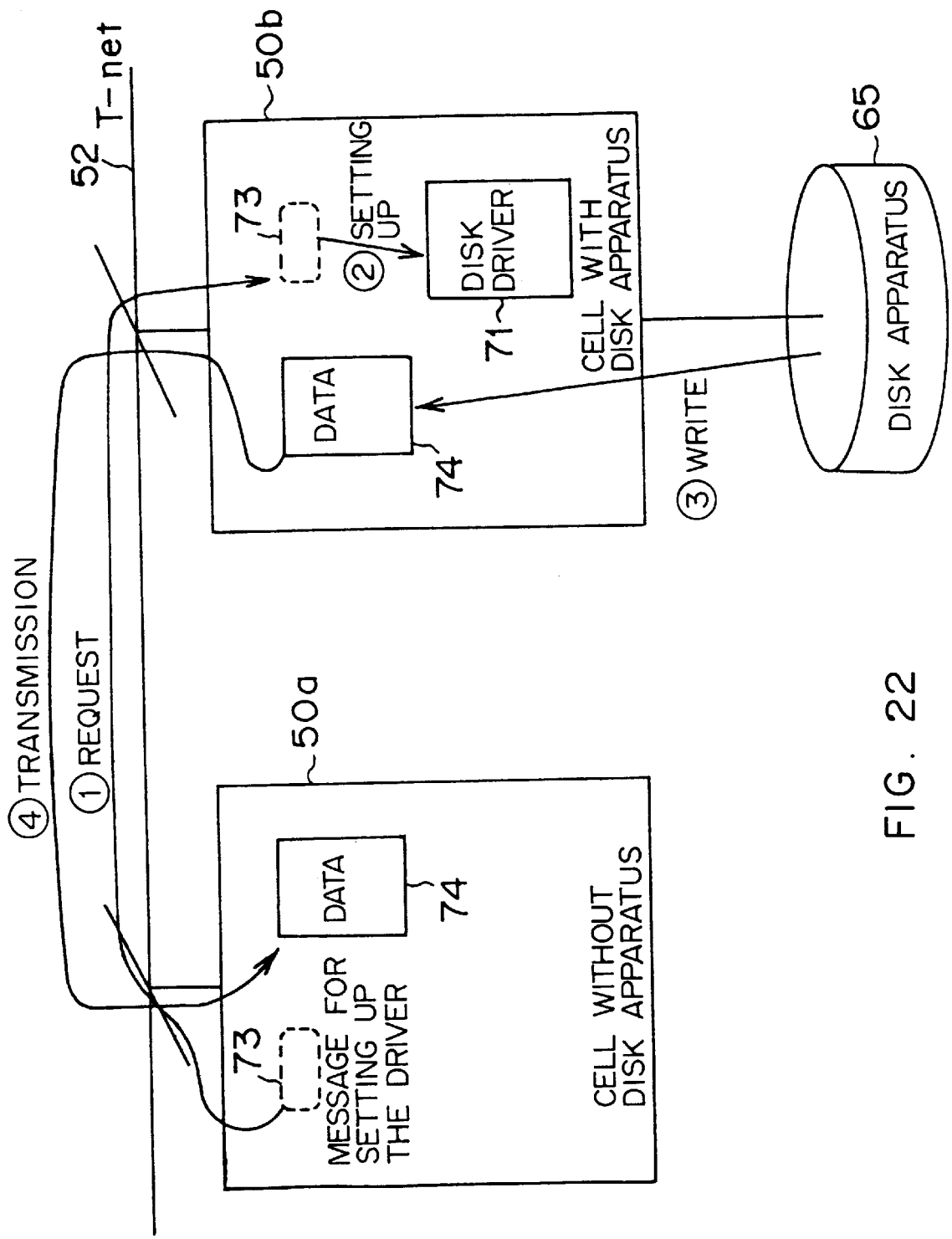
FIG. 22 shows a view (Part 2) of a summary of the disk access method according to the second embodiment.
Figure 23:
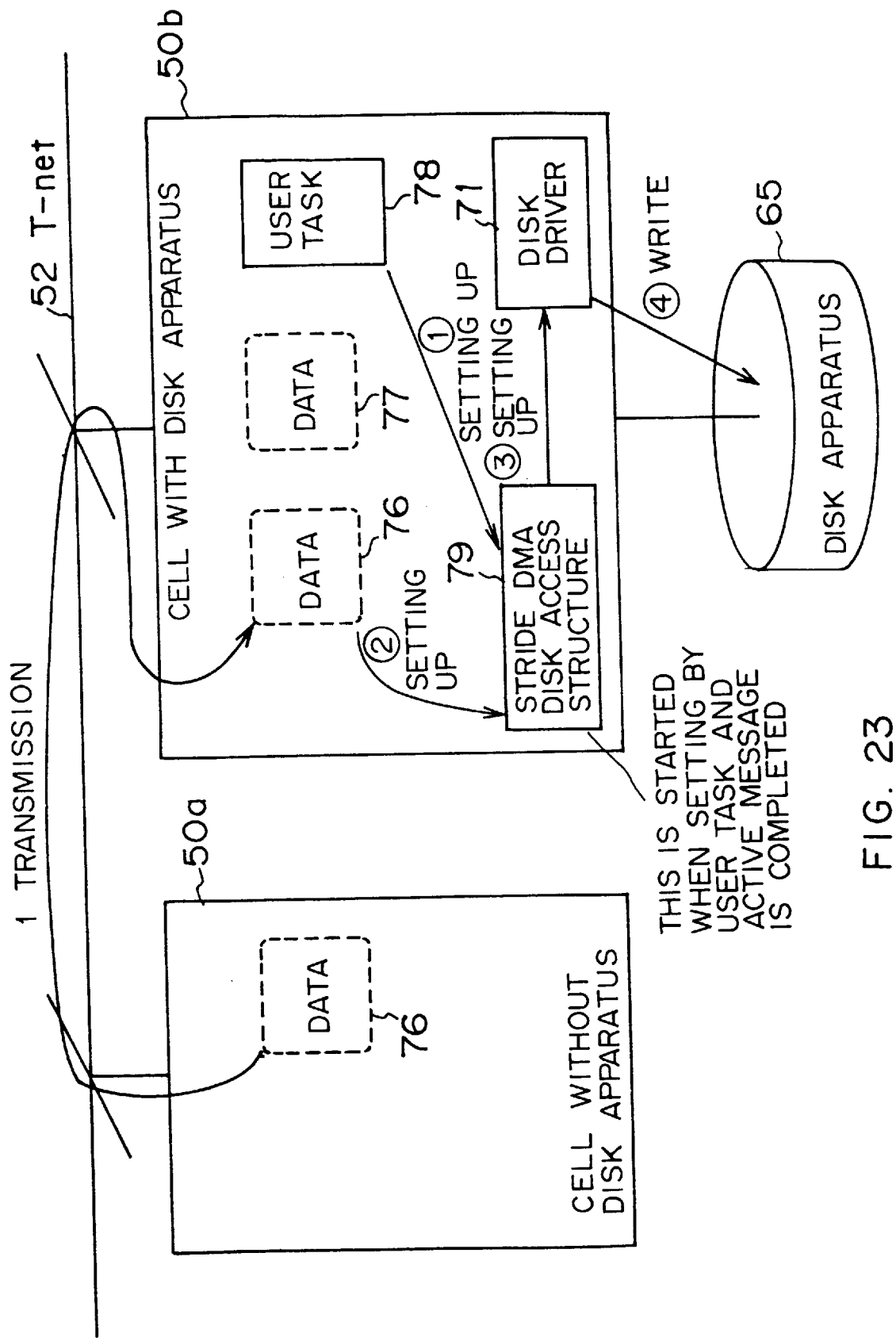
FIG. 23 shows a view (Part 3) of a summary of the disk access method according to the second embodiment.

FIGS. 21 to 23 show views for explaining the operation of the disk access method used in the second embodiment. FIG. 21 explains an access method for writing data in the disk apparatus. In FIG. 21, data 70 is transmitted from cell 50a to the cell 50b with disk through a T net 52 by using a later described message for the data I/O as shown 1. Then, the message sets up the disk driver 71 provided in the cell 50b with disk as shown 2) and the data 70 is written into the disk apparatus 65 as shown by 3).

FIG. 22 shows a view for explaining the data transferred from the disk apparatus 65 to the cell 50a without disk. In FIG. 22, when the message (data transfer request) 73 for setting up the disk driver 71 in the cell 50b with disk is transmitted from the cell 50a without disk to cell 50b with disk as shown in 1), the disk driver is set up as shown in 2) and data 74 is read from the disk apparatus 65 as shown in FIG. 3), and the data is transferred to the cell 50a without disk through the T net 52 as shown in 4).

FIG. 23 shows a view for explaining the way the data transferred from the cell without disk is combined with the data stored in the cell with disk on the side of the cell with disk through the data stride operation and is then written into the disk apparatus, as in the first embodiment. In FIG. 23, data 76 is transferred from the cell 50a without disk to cell 50b with disk through a route 1), as in FIG. 21, and is set in a stride DMA disk access structure 79 as shown in 2). In the cell 50b with disk, the data 77 previously stored in the memory is set in the stride DMA disk access structure 79 as the synthesizing subject data simultaneously with the data 76 under the control of user task 78 as shown in route 1). The disk driver 71 is set up and two data 76 and 77 are combined as the disk driver 71 is activated as shown in 3), and are written into the disk apparatus 65 as shown in 4).

Figure 24:
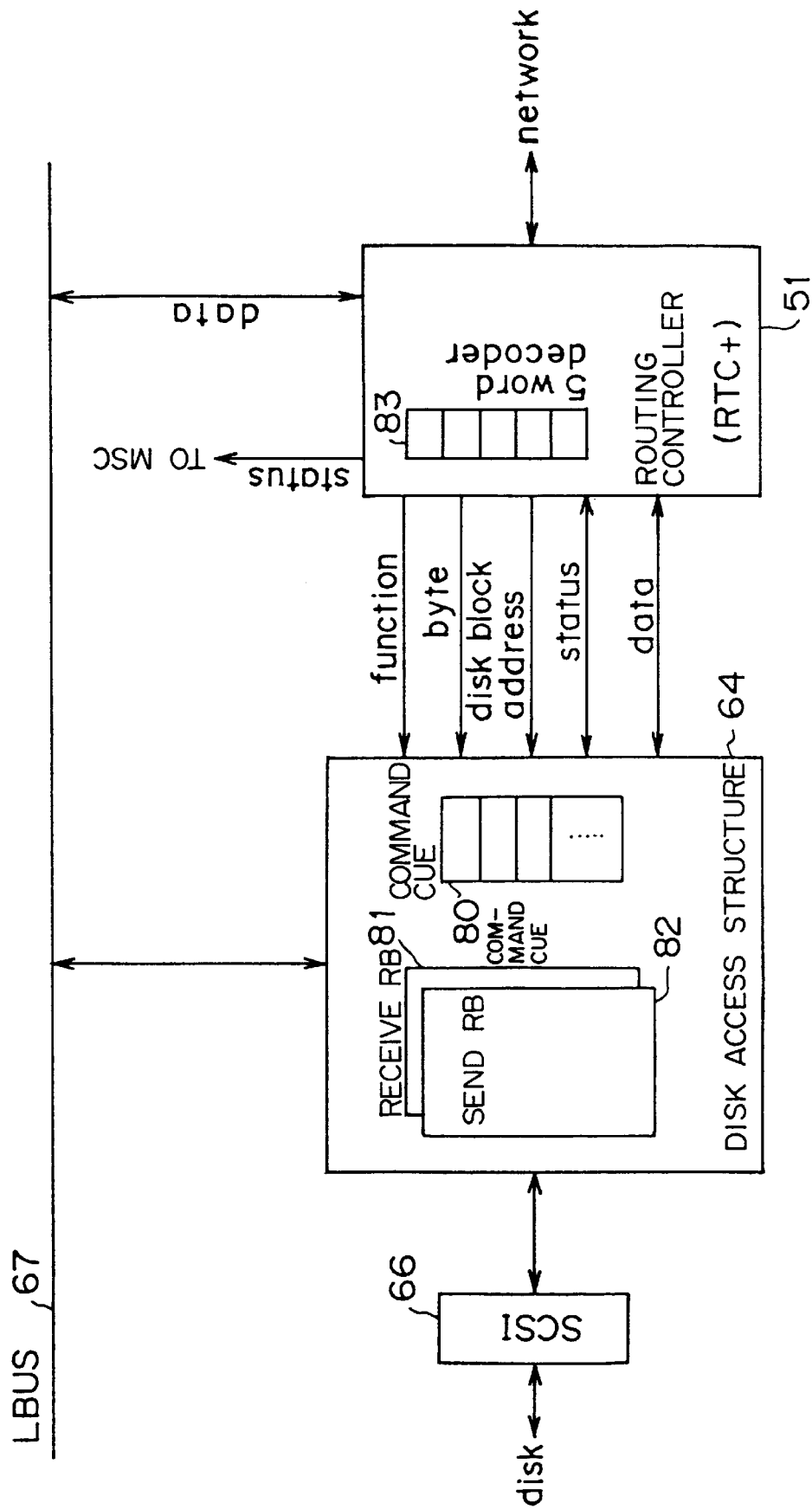
FIG. 24 shows a view of explaining a summary of operation of a disk access structure.

FIG. 24 explains the operation of the disk access structure according to the second embodiment. FIG. 24 provides a routing controller 51, and SCSI 66 operating an interface with the disk apparatus, which are shown outside the cell 50 in FIG. 20 and disk access mechanism 64 and local bus (LBUS) 67. In FIG. 24, in the interior of the disk access mechanism 64 are the command cue 80 for storing the data access command provided in the message for data I/O which are transmitted for use in a disk access operation from the other cells, receive ring buffer (RB) 81 for temporarily storing the data which are transmitted from the other cells together with the message for data I/O and are to be written in the disk apparatus, and send ring buffer RB 82 for temporarily storing the data to be transferred to the other cells. The five words decoder 83, which is provided in the routing controller (RTC) 51 to decode the data corresponding to the disk access command stored in the first five words of the data I/O message transmitted from the cell without disk. The operation of the five words decoder 83 and command cue 80 provided in the disk access structure will be described later.

Figure 25:
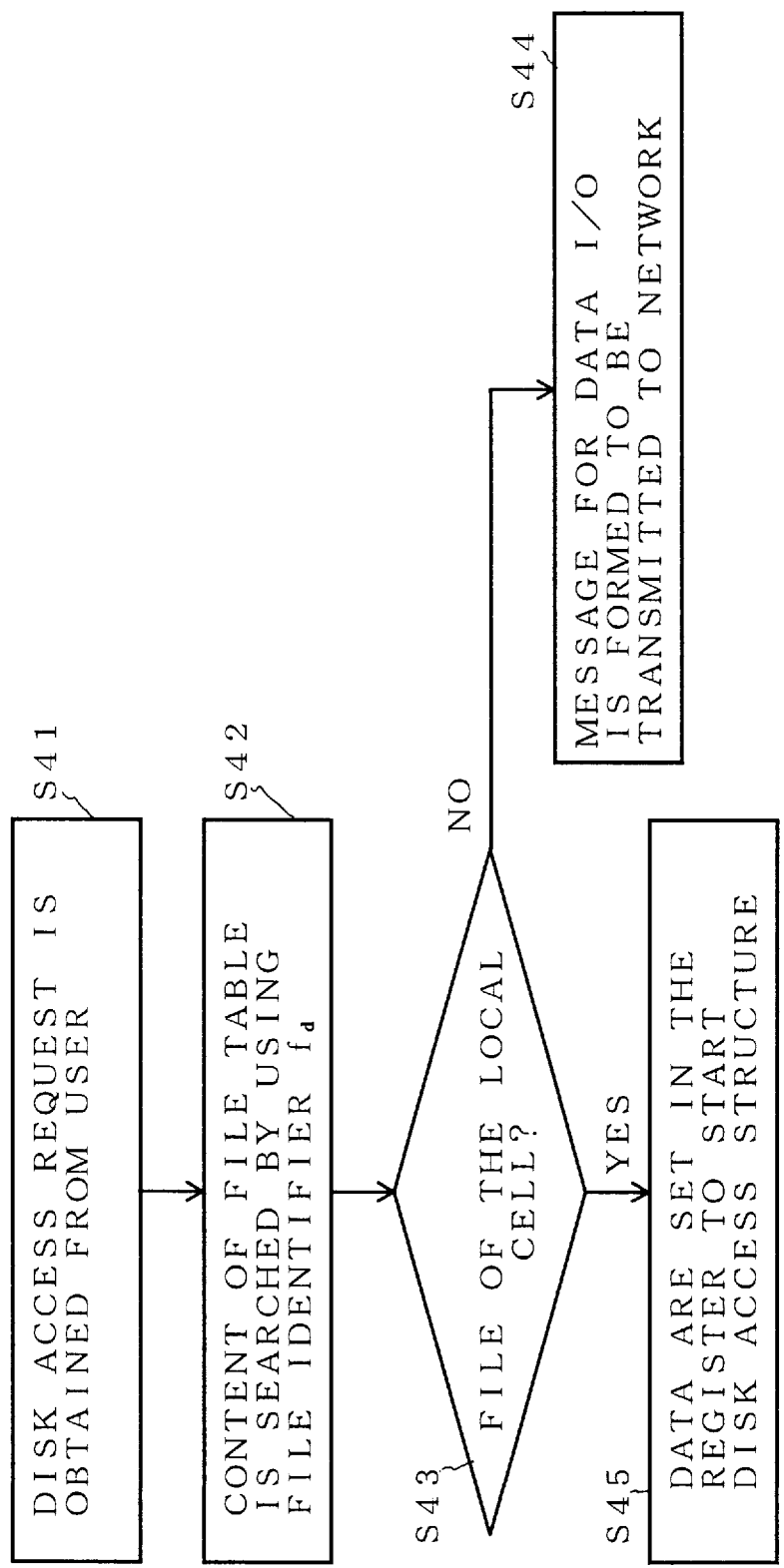
FIG. 25 shows a flow chart of a process of disk access request issued by the user.

FIG. 25 shows a flow chart of a process performed in response to a disk access request from the user in respective cells forming the parallel computer system. When the process starts in FIG. 25 and the disk access request is obtained from the user at step S41. This disk access request provides an identifier of a file in which the data is stored, a function for the disk access operation, namely, specification as to whether the data are to be read or stored, and the data size of access data.

In response to the disk access request, the content of the file table is searched by using a file identifier $f_d$ at step S42. The file table stores the cell identifier storing the file and physical disk block provided in the disk apparatus in response to the file identifier. At step S43, the cell identifier determines whether the file is stored in the disk apparatus in the local cell.

When the disk apparatus is not connected to the local cell or the designated file identifier is not stored, even if the disk apparatus is connected to the local cell, the message for data I/O is assembled to be transmitted to the network to activate or set up the disk access mechanism of the cell designated by the cell identifier, as shown in step S44. On the other hand, when the file is stored in the disk apparatus of the local cell, the data for performing the data access is set in the register in the local cell to activate the disk access structure in step S45.

Figure 26:
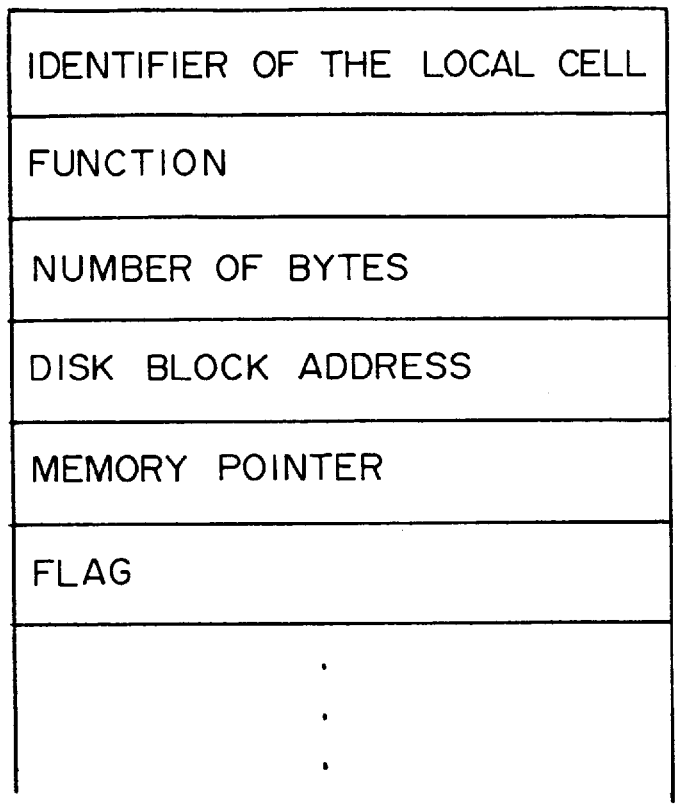
FIG. 26 shows a view of explaining the data set in a register in a local cell.

FIG. 26 explains the data set in the register in the local cell when the designated file is stored in the disk apparatus of the local cell in FIG. 25. In FIG. 26, the data stored in the register before the start up of the disk access mechanism include an identifier of the local cell, a function designating write or read of the data, the number of bytes designating the size of the access data, a disk block address and for designating the data storing location in the disk apparatus, a memory pointer designating a memory location for storing the read data, for example, and a flag to be set upon completion of a data access operation, for example.

Figure 27:
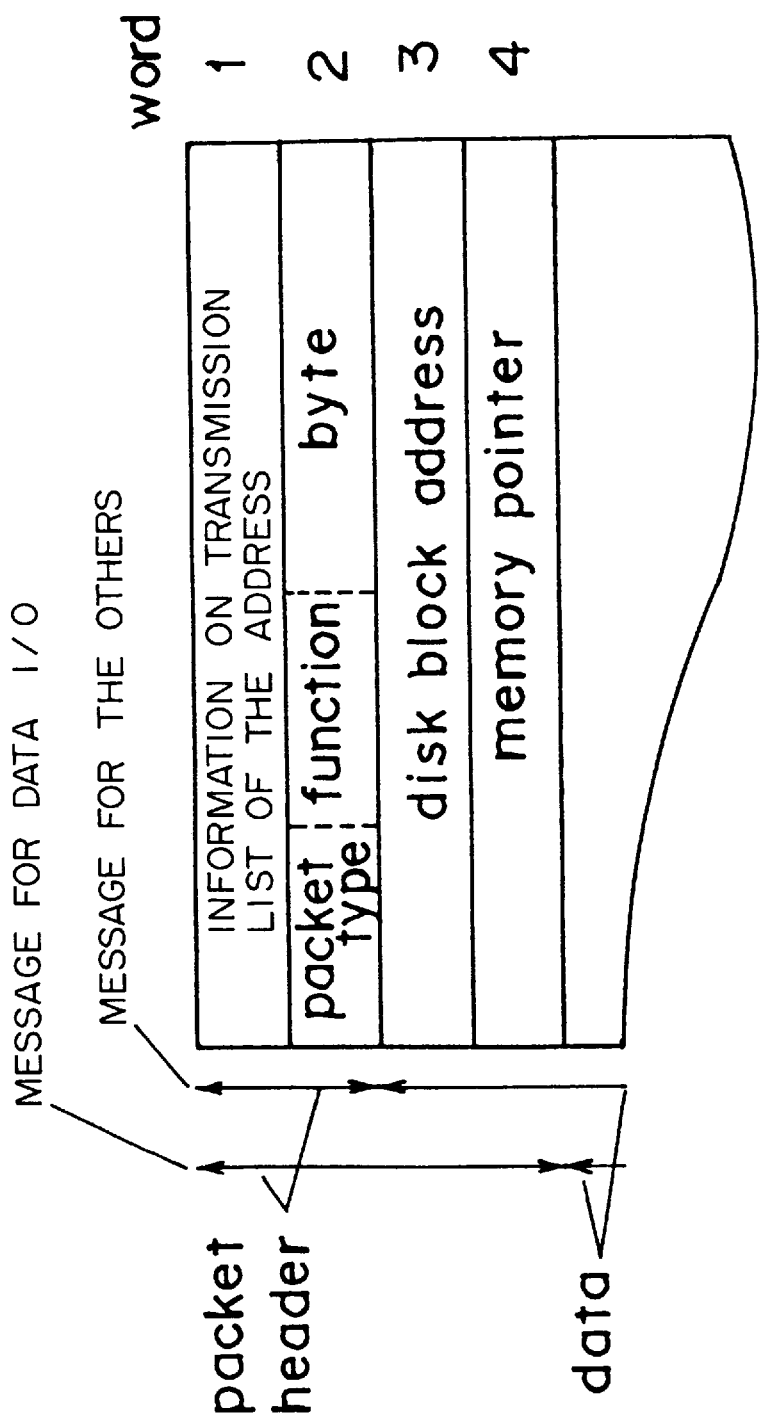
FIG. 27 shows a view (Part 1) of explaining the packet format of the data I/O message.
Figure 28:
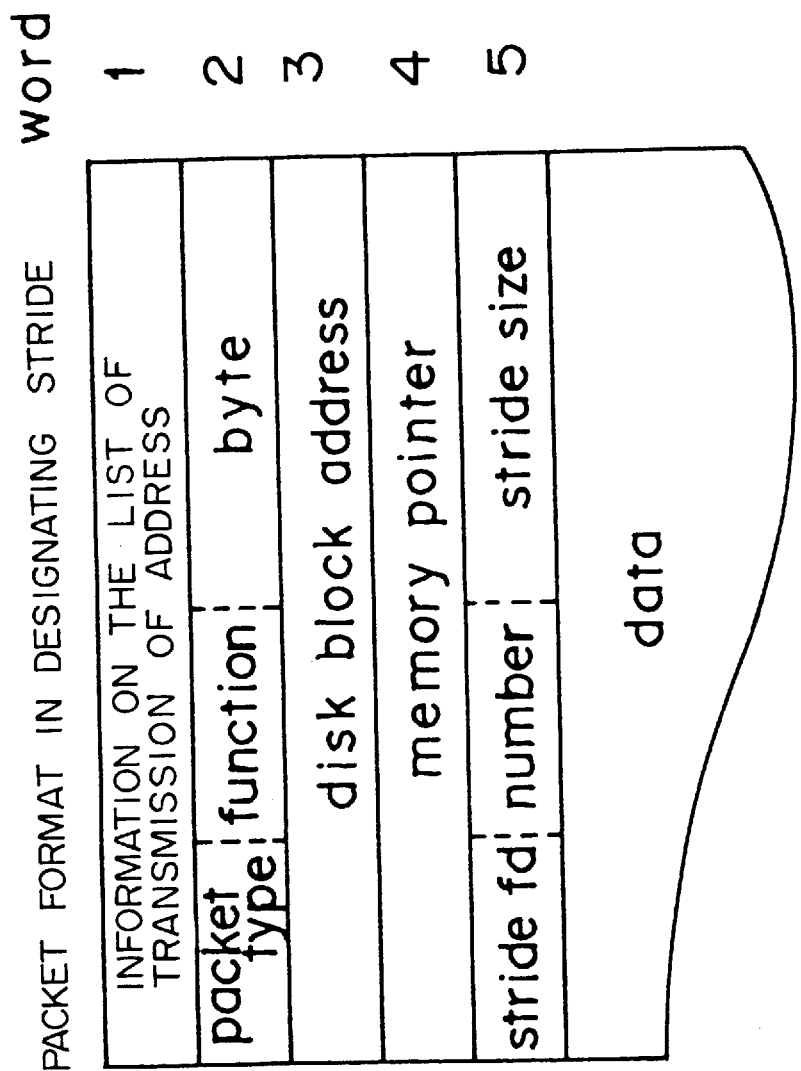
FIG. 28 shows a view (Part 2) of explaining the packet format of the data I/O message.

FIGS. 27 and 28 show views for explaining the packet format of the data I/O message used in the second embodiment. FIG. 27 explains the difference in format between the message for the data I/O message and other messages. In FIG. 27, in case of a message other than the data I/O message, the message data, for example, the control data, is written after the third address of the packet, the address information of an identifier of the destination cell is written in the first word and the packet type is stored in the head 0 byte in the second word. The packet type designates an ordinary packet when bit 0 is "1" and a data I/O packet when bit 0 is "0" and the bit after bit 1 is reserved.

When the message is for the data I/O, the data to be used for transfer is stored after the fifth word and the words up to fourth word are used as the packet header. A function designating data read or data write and the number of bytes designating the length of the transfer data are stored after the packet type at the second word. The disk block address is stored as the address designating the data storage location within the disk apparatus is stored as the third word, and a memory pointer designating the address of the memory at which the data read from the disk apparatus is to be written is stored as the fourth word.

FIG. 28 shows a format of the data I/O message designating the stride process in addition to the access to the disk apparatus. In FIG. 28, the byte of the function provided at the second word from the head of the packet designates the stride process. The bit 0 of the byte of the function provided at the second word in FIGS. 27 and 28 designates the data read process and the bit 1 thereof designates the write process. In addition, "1" of the bit 2 designates the stride process. For example, the bit after the bit 3 designates a reserved area.

When the stride process is designated by the function byte, after the first five words of the data the I/O message are used as the packet header.

The 0 byte of the fifth word designates the stride identifier, 1 byte thereof the stride number, and 2 and 3 bytes thereof designates the stride size. The stride identifier is used to present the commands to which respective packets belong, when a plurality of stride commands are almost simultaneously issued. The number of strides represents the number of divisions when the data is divided and is equal to a value obtained by subtracting '1' from the effective number of the points shown in the first embodiment. The stride size represents the divided size of data which is sent to or sent from an object cell.

Figure 29:
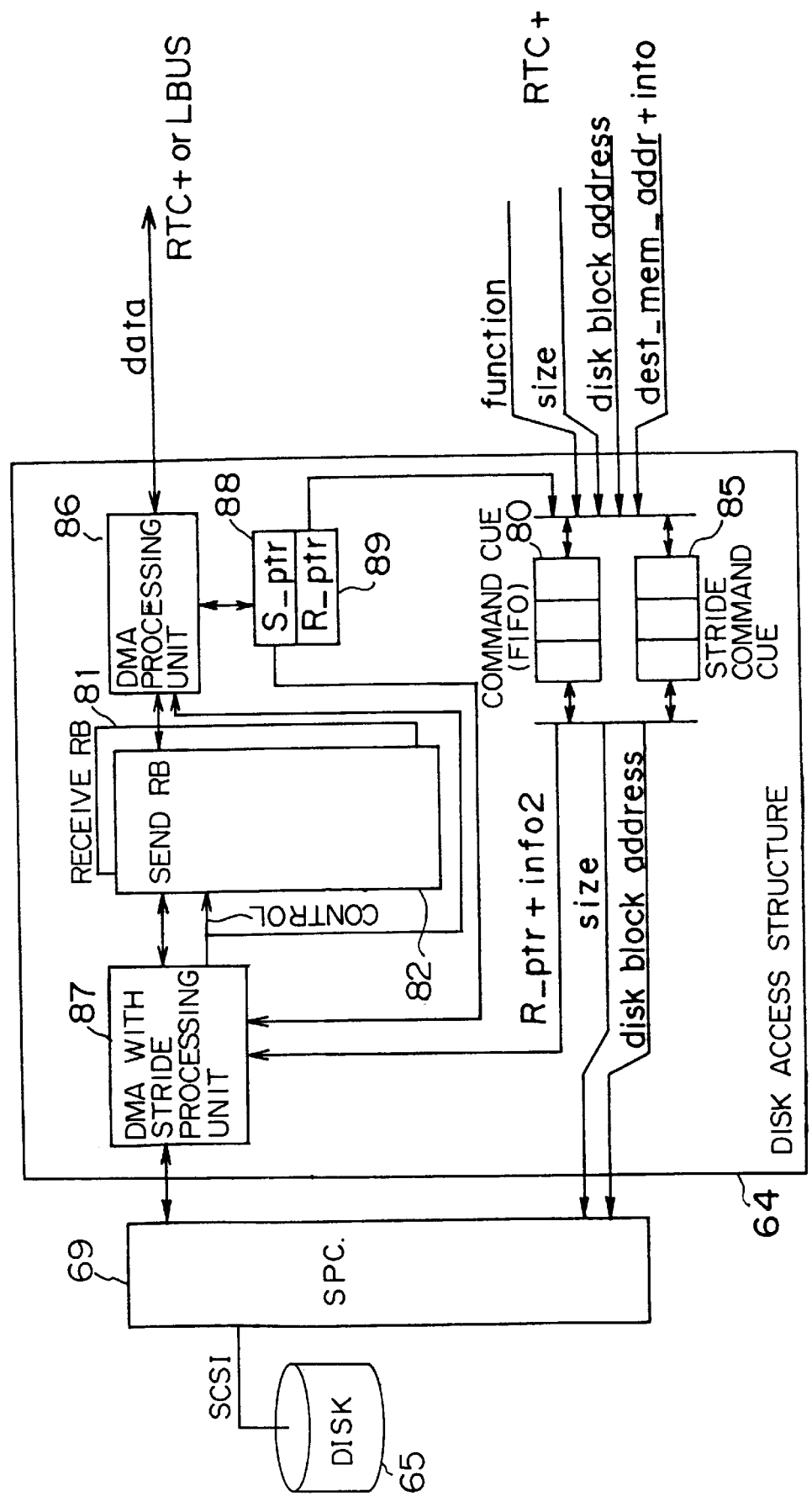
FIG. 29 shows a block diagram designating a detail structure of a disk access structure.

FIG. 29 shows a block diagram of a detailed structure of the disk access structure shown in FIG. 24. In FIG. 29, inside the disk access structure 64, is the command cue 80 in which the ordinary disk access commands are stored, stride command 85 for storing a disk access command including a stride process, DMA processing 86 for directly performing the memory access within the cell, DMA with stride processing unit 87 performing a DMA process including a stride process, register (S ptr) 88 for representing an address at which the data to be sent next after RB is stored and register (R ptr) 89 for representing an address at which the data next to the receive RB is stored have been added to the structure shown in FIG. 24.

In FIG. 29, the command cue 80 or stride command cue 85 stores the content of the disk access command which is decoded by the 5 word decoder provided in the routing controller 51 shown in FIG. 24. The contents of command cue 80 or stride command cue 85 include the function of the second byte from the head of the packet with data size designated by the number of bytes, disk block address of the third word which are explained by referring to FIGS. 27 and 28, and in addition, a destination memory address used as a memory pointer for the fourth word and control information (Info) such as the transmitting source cell identifier, and further, the stride information, is set in the command 80 or stride command cue 85 when the stride process is designated.

When the disk is accessed, the size of the access data and the disk block address are provided to SCSI66 including the disk driver. SPC 69 is not shown in FIG. 24, but the disk access structure provides the address and data size of the block which is the object of an access, to SPC 69, thereby starting disk apparatus 65, and the DMA with stride processing unit 87 communicates the data with disk apparatus 85. When the stride process is designated, the stride information is provided to the DMA with stride processing unit 87 in addition to the head address S ptr of the vacant area of send SB and the head address R ptr of the vacant area of the receive RB. Info 2 includes the stride information, the cell identifiers upon data read and the task identifier.

In the second embodiment, the stride information such as the value of the pointer, the state, and the value of the counter which are required for stride processing in the DMA with stride processing unit 87, namely, the content to be stored in the controlled register group 44 in FIG. 3 in the first embodiment, are maintained in the controller of processing unit 87 and used for control upon disk access.

The content of the command cue 80 and stride command cue 85 are spatially mapped in a memory of the local cell and the content thereof can be set from a CPU of the local cell. When the disk access command is set in both the command cue 80 and stride command cue 85, the stride command, for example, is processed with priority.

In FIG. 29, the disk block address and the data size are stored in a controller of SPC69 and the head address S ptr of the vacant area of the send RB is set in the DMA with-stride processing unit 87, thereby starting the disk driver, when the data read command from the disk which is at the head of the command cue 85. When the data is transferred to send RB 81, the DMA processing unit 86 is assembled into a packet and is transmitted to the network through the routing controller 51. When the data is required by the local cell, the data is transmitted to the designated address of the memory through the local bus (LBUS) 67.

When the write command designating the data write into the disk apparatus is carried out, and the command is the head of the command cue 80 or stride command cue 85, the disk block address and the data size are set in the controller of SPC69, the head address R ptr of the vacant area of the receive RB82 are set in the DMA with-stride processing unit 87, the disk driver is started and the data stored in the receive 82 is transferred to the disk. When the data is written into the disk, an ACK message designating completion of the data write, for example, is returned to the cell for requesting the data write.

Figure 30:
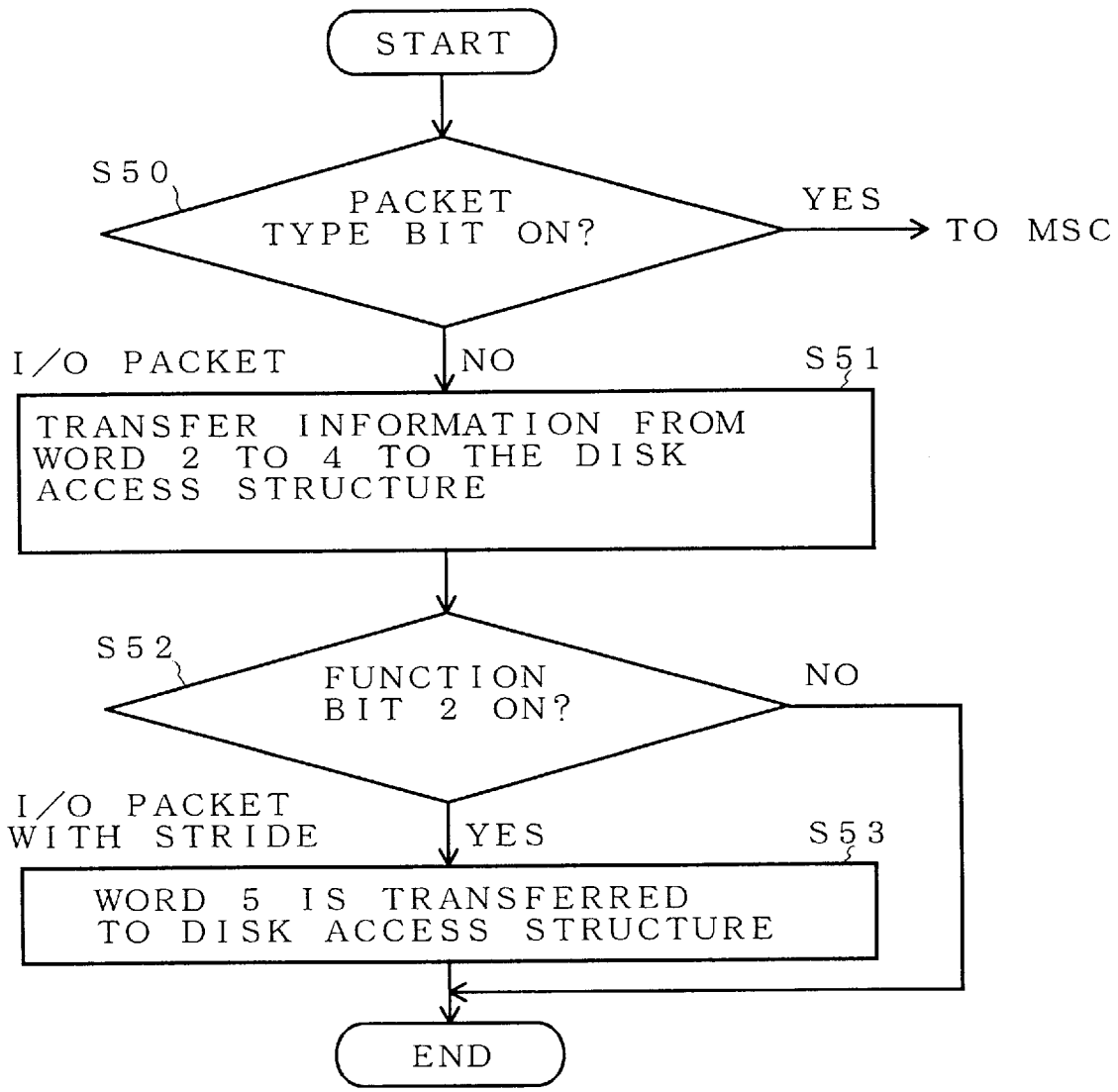
FIG. 30 shows a flow chart designating an operation of the 5 word decoder provided in a routing controller.

FIG. 30 shows a flow chart of an operation of the 5 word decoder 83 provided in the routing controller 51 explained by referring to FIG. 24. The 5 word decoder 83 analyzes the contents of the packet headers of the 5 words and comprises the hardware of logic circuit 1. An operation of the 5 word decoder 83 is explained by referring to a flow chart. In FIG. 30, the step S50 determined whether the packet type bit 0 of the 0 byte of the second word in the packet header explained in FIGS. 27 and 28 is on or, namely, '1'. In the case of '1', the packet is not the data I/O message and the packet is sent to the message controller (MXC) 63 for controlling ordinary communication.

When the bit 0 of the 0 byte of the second word in the packet header is not '1', the information from the second word to the fourth word of the packet header is transferred to the disk access structure in Step S51, and step S52 determines whether the bit 2 of the function of the 1 byte of the second word is '1' or not. When the bit 2 is not '1', the stride process is not designated and thus the process is completed. When the bit 2 '1', data necessary for the stride process, namely, the content of the fifth word is transferred to the disk access structure in step S53, thereafter the process is completed.

In FIG. 24, the content of the header 5 word of the packet received from the network is decoded by the routing controller 51 and the function, the number of the bytes, disk block address and other necessary information are stored in the command cue and the transferred data is written into the receive RB81. When the command comes to the head of the command cue, the command is executed as described above and then the reply is returned to the request source cell upon completing the execution of the command.

When the data encounters the read command for the data, the content is decoded by the 5 word decoder 83 and the content of the command is set in the command cue 80. When the command comes to the head of the command cue, the command is executed and the data is written in the send RB82. When the data write is completed, the packet header is attached to the data and the packet is transferred to the request source cell. When the volume of data to be transferred is large, a plurality of packets are used to perform the data transfer.

Figure 31:
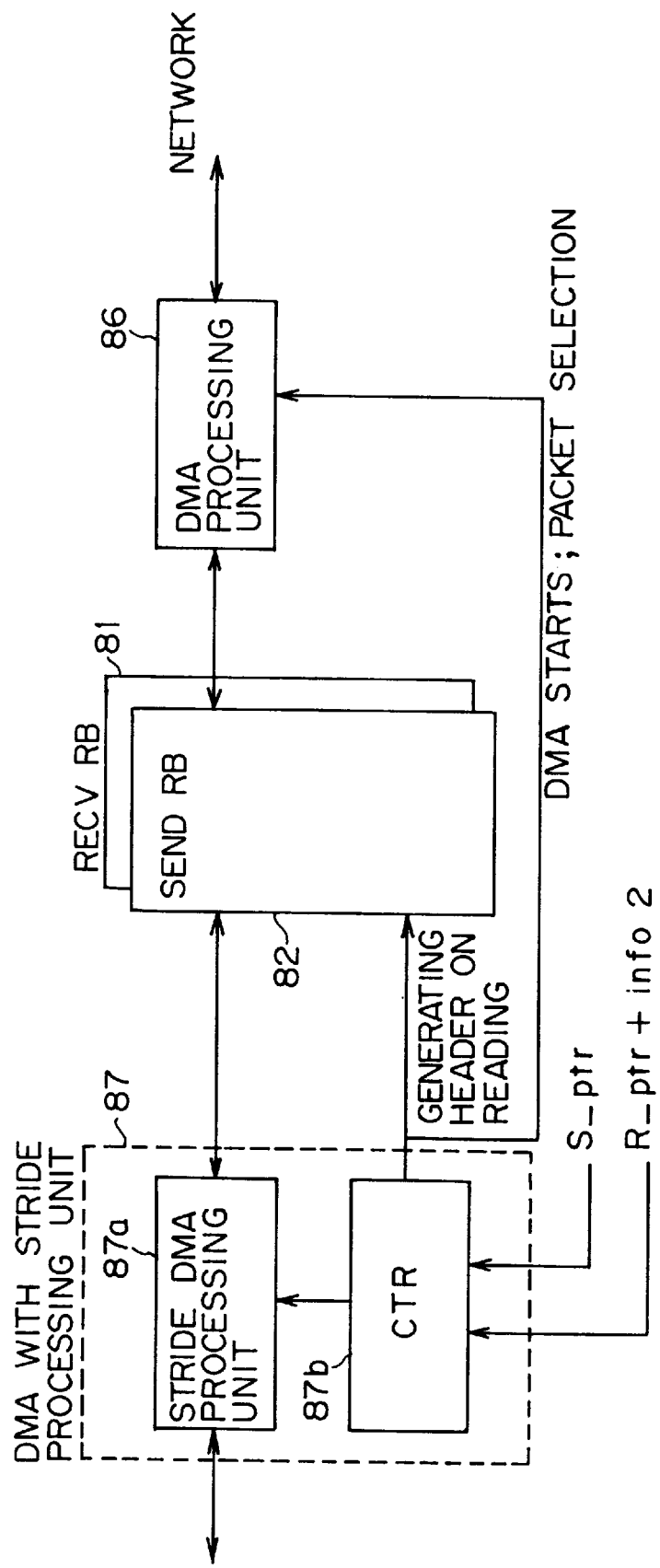
FIG. 31 shows a block diagram designating the detailed structure of the DMA with stride processing unit 87 shown in FIG. 29.

The Stride process shown in the second embodiment is described in detail. FIG. 31 shows a block diagram designating the detailed structure of the DMA with stride processing unit 87 shown in FIG. 29. In FIG. 31, the DMA with stride processing unit 87 comprises stride DMA processing unit 87a and controller (ctr) 87b. Controller 87b receives the address S ptr of the next data in the send RB and the storing address R ptr of the next data in the receive RB and info 2. Info 2 comprises data including the stride information and the self identifier used upon read. Upon data read, the result of the generation of the head to be attached to the packet transmitted to the network is transmitted to send RB 82 from controller 87b and controller 87b supplies a DMA starting signal for transmitting the packet to the network to the DMA. Stride processing unit 87 comprises the DMA structure for performing the data transfer between the disk apparatus and the send RB or the receive RB. DMA processing unit 86 comprises the DMA structure for performing the data transfer between the send RB or receive RB and the network driver.

Figure 32:
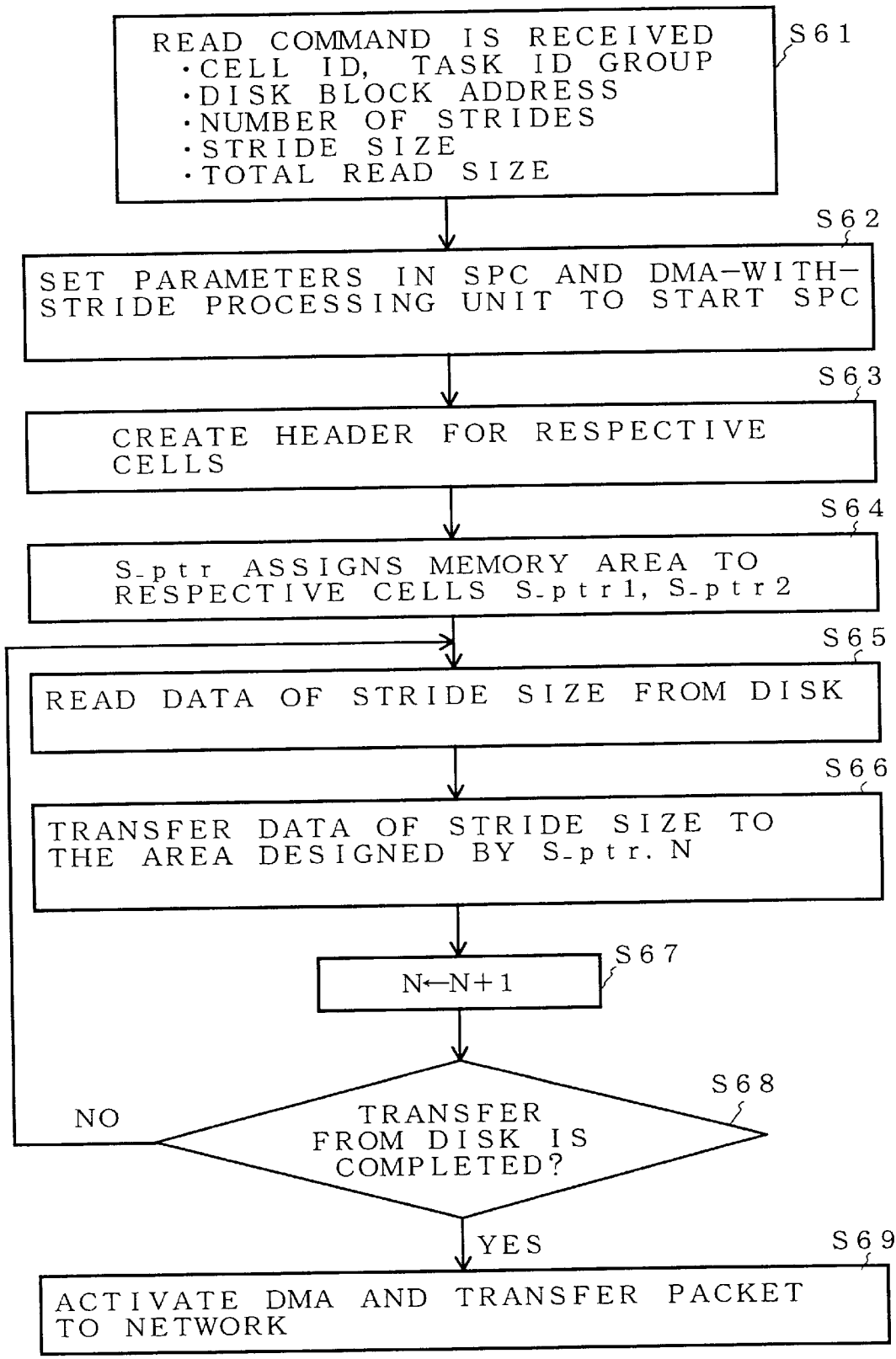
FIG. 32 shows a flow chart of a stride process for dividing serial data stored in the disk apparatus and for transmitting a plurality of cells through the network.

FIG. 32 shows a flow chart of a stride process for dividing serial data stored in the disk apparatus and for transmitting a plurality of cells through the network. When the process starts, in Step S61, the read command is accepted by the stride command cue 85. The command, as a parameter, designates the cell identifier, the task identifier, the block address of the disk, the number of strides, namely, the number of effective pointers in the first embodiment, the stride size, namely, the data size for one transmission, and the total read size, namely, the counter value (total byte numbers). Then, at Step S62, these parameters are set in SPC69 and DMA stride processing unit 87 to start SPC 69. Steps S61 and S62 are carried out by the stride command cue 85.

At S63, controller 87b in DMA with stride processing unit 87 creates the head to be added to the packet for respective cells. At step S64, controller 87b assigns the head address of the memory area for storing the data for respective cells to the head address S ptr of the vacant area in send RB 82.

Figure 33:
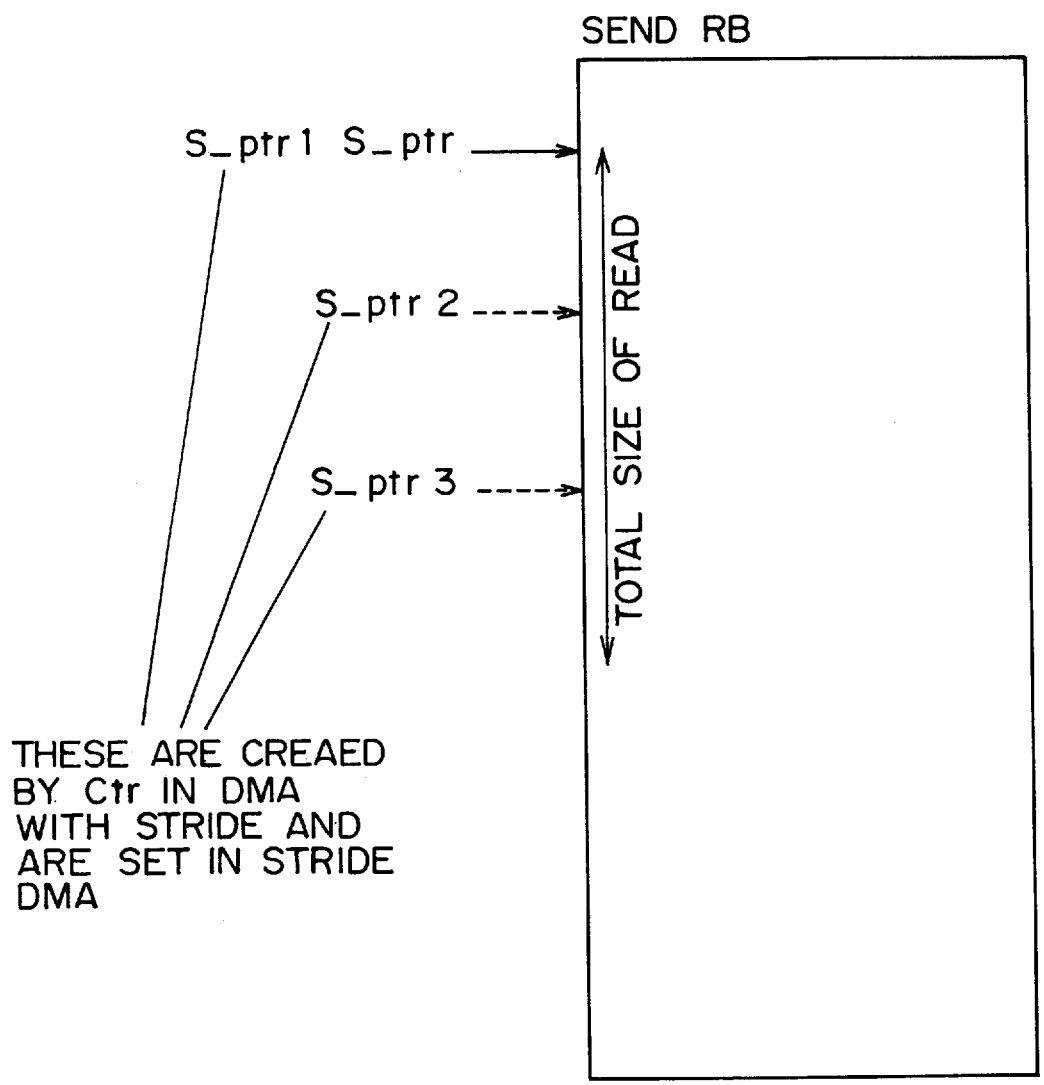
FIG. 33 shows a view for explaining a memory area to be assigned by controller 87b in step S64.

FIG. 33 shows a view for explaining a memory area to be assigned by controller 87b in step S64. For example, the head address S ptr1 of the storing area of the data corresponding to cell 1 is the same as the address S ptr1, and S ptr2, S ptr3, . . . are designated as the head addresses of the area for storing the data for cells 2, 3, . . . .

In FIG. 32, at step S65, stride DMA processing unit 87a and SPC 69 read the data with the stride size, the data for one transmission timing from the disk 65. At step S66, the data with the stride size is transferred to the area designated by S ptrN, for example S ptr1. At step S67, the value of N is incremented. At step S68, it is determined whether the data transfer from the disk is completed. These steps S66 to S68 are carried out by stride DMA processing unit 87a.

If the data transfer from the disk is not yet completed, the process is repeated starting with step S65. Then, the data are successfully stored in the data transfer area to respective cells as shown in FIG. 33. When it is determined that the data transfer is completed, the DMA processing unit 86 starts at step S69 and the transmission of the packet to the network is conducted, thereby completing by the process. The start of DMA processing unit 86 at step S69 is executed by controller 87b as described above.

Figure 34:
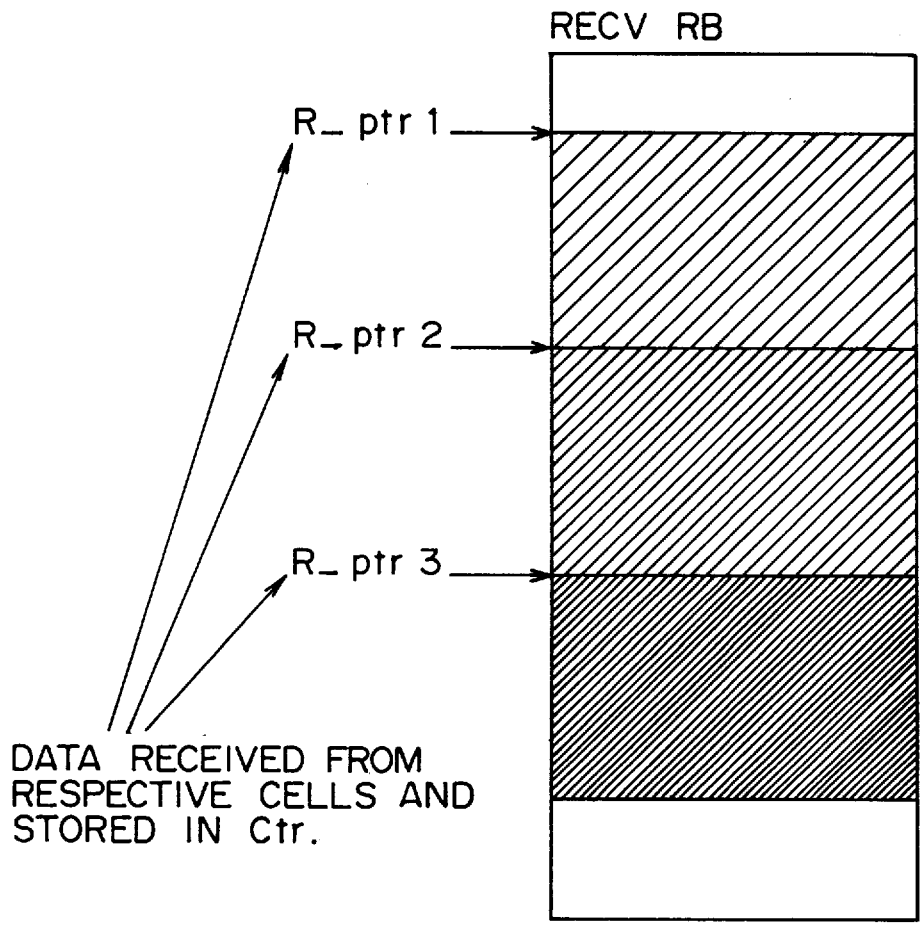
FIG. 34 shows an area for storing the data provided in the receive ring buffer in which the data transmitted from a plurality of cells through the network is merged and stored in the disk apparatus in accordance with the stride process.

FIG. 34 shows an area for storing the data provided in receive RB81 in which the data transmitted from a plurality of cells through the network is merged and stored in the disk apparatus in accordance with the stride process. In FIG. 34, the R ptr1, R ptr2, R ptr3, . . . of the pointer are designated to respective data transmitted from respective cells and stored in receive RB81 provided to controller 87b. The pointer and the stride size, for example, are set in the DMA with stride processing unit 87 when the stride access command comes to the head of stride command cue 85, thereby starting the disk. The pointers designating the head of the respective areas shown in FIG. 34 and the data with predetermined stride size are sequentially obtained and written into the disk apparatus, thereby synthesizing the data.

What is claimed is:

1. A secondary storage apparatus access system in a parallel computer system having a plurality of computers connected to each other through a network, for merging and distributing data between a memory and a secondary storage, both in one of said computers, said secondary storage apparatus access system in one of said computers comprising:

secondary storage means for storing partial data comprising stride object data which is an object of a data distribution or data merging operation;

stride data storing position register means for storing a data storing position pointer for said secondary storage means;

memory means for storing said stride object data into said memory;

stride data storing destination register means for storing a data storing destination pointer for said memory means or a pointer designating a header of a packet to be transmitted to another computer when stride object data is included in the packet;

partial data size register means for storing a data size of the partial data; and stride processing means for transferring the stride object data designated by the data storing position pointer stored in said stride data storing position register means in accordance with the data storing destination pointer stored in the stride data storing destination register from said secondary storage means to said memory or to another computer through the network in a merging or distributing manner in response to a data read command by using the data size stored in the partial data size register means.

2. The secondary storage apparatus access system for use in the parallel computer system according to claim 1, wherein said secondary storage means comprises a disk apparatus, and wherein when the stride object data stored in the disk apparatus forming the secondary storage means is distributed in response to read command data, said stride data storing position register means stores a head position of an object data storing area within the disk apparatus;

said stride data storing destination register means stores a plurality of data storing positions in said memory means for storing object data in a distributed manner or a plurality of pointers designating a header of a plurality of packets to be sent to another computer, distributed data being included in one of said packets;

said partial data size register means stores the data size of the distributed data; and said stride processing means distributing data stored at the disk apparatus, storing data in said memory or performing a distribution operation in order for data to be stored in a plurality of packets.

3. The secondary storage apparatus access system for use in the parallel computer system according to claim 1, wherein said secondary storage means comprises a disk apparatus; and wherein when the stride object data stored in the disk apparatus forming said secondary storage means in a distributed manner is read in response to a data read command, said stride data storing position register means stores a plurality of data storing positions in the disk apparatus in which the stride object data is stored in a distributed manner;

said stride data storing destination storage means stores head position information of the data storing area in the memory means for storing data after the distributed data is merged or storing a pointer designating a head of a packet to be transmitted to another computer, the merged data being included in the packet;

said partial data size storage means stores the size of respective distributed data; and said stride processing means merges the data stored in the disk apparatus in a distributed manner and stores the merged data in the memory means or stores the merged data in the packet to be transmitted to another computer.

4. The secondary storage apparatus access system for use in the parallel computer system according to claim 1, wherein the secondary storage means comprises a disk apparatus, and wherein when the stride object data is written in the disk apparatus in response to a data write command, said data storing position register means stores a plurality of data storing positions in said secondary storage means in which the stride object data are stored in a distributed manner or a plurality of pointers designating a header of a plurality of packets in which the distributed data are included;

said stride data storing destination register means stores a head position information of the data storing area in which the distributed data are merged in a disk apparatus and stored in a disk apparatus;

said partial data size storage means stores the size of the distributed data; and said stride processing means merges the distributed data stored in the first data storage means or a plurality of packets to form the data to be stored in the disk apparatus.

5. The secondary storage apparatus access system for use in a parallel computer system according to claim 1, wherein:

said secondary data storage means comprises a disk apparatus storing the stride object data in a distributed manner in response to a data write command;

said stride data storing position storage means stores a head position information of the data storage means in a first data storage means in which the stride object data is stored or a header of the packets in which the object data is included and which is transmitted from another computer;

said stride data storing destination register means stores a plurality of data storing positions in the disk apparatus for storing the stride object data in a distributed manner;

said partial data size register means stores the size of the partial data; and said stride processing means distributes the data stored in the first data storage means or packet transmitted from another computer so that the data is stored in the disk apparatus.

6. The secondary storage apparatus access system for use in the parallel computer system according to claim 1, further comprising state data storage means for storing state data including data designating that said stride data storing position register means stores a storing position of the stride object data in said secondary storage means or a pointer designating the packet head, in which the storing position of the stride object data in said secondary storage means or the pointer designating the packet head is designated by said stride data storing position register means;

data indicating what said stride data storing destination register means designates, said stride data storing destination register means holding either the data storing position within the secondary storage means or a pointer to the the packet header;

data designating whether said secondary storage means and/or an additional data storage means includes a disk apparatus or a memory device when said stride data storing position register means stores the data storing position in the secondary storage apparatus and/or said stride data storing destination storage means stores the data storing position within the additional data storing apparatus.

7. A storage data access system for accessing a disk apparatus in a parallel computer system, comprising:

a first computer provided with a disk apparatus;

a second computer not provided with a disk apparatus and connected to said first computer provided with the disk apparatus through a network; and disk access means, provided in said first computer provided with said disk apparatus, for transferring data between the first computer provided with the disk apparatus and the second computer not provided with the disk apparatus in response to receipt of a data transfer data request or a communication message from the computer not provided with the disk apparatus, by using file identifier information without using software resources provided in the first computer provided with the disk apparatus.

8. The storage apparatus access system in a parallel computer system according to claim 7, wherein said disk apparatus includes a disk driver; and said disk access means starts the disk driver for the disk apparatus in the first computer provided with the disk apparatus and writes transfer data at a suitable address of said disk apparatus in response to receipt of a data transfer informing message including the transfer data from the second computer not provided with the disk apparatus.

9. The storage apparatus access system in a parallel computer system according to claim 8, wherein said data transfer informing message comprises a packet having a predetermined format.

10. The storage apparatus access system in a parallel computer system according to claim 7, wherein said first computer having the disk apparatus further comprises a DMA with stride process means provided in said disk access means for dividing a group of data into different areas of the disk apparatus or for writing a plurality of the data in areas as a group; and said disk access means writes transfer data in the disk apparatus in accordance with a stride disk write command in response to a receipt of data transfer informing message including the stride disk write command and the transfer data.

11. The storage apparatus access system in a parallel computer system according to claim 7, wherein said disk apparatus includes a disk driver;

said disk access means starts the disk driver of the disk apparatus provided in a said first computer in response to the receipt of the data transfer request message from the second computer, not provided from the disk apparatus, and transfers the data stored in the disk apparatus to the second computer which is not provided in the disk apparatus.

12. The storage apparatus access system in a parallel computer system according claim 11, wherein said data transfer request message comprises a packet having a predetermined format.

13. A secondary storage apparatus access system for use in a parallel computer system for connecting a plurality of computers to each other through a network, one of said computers comprising:

disc means for storing partial data comprising stride object data which is an object of a data distribution operation;

stride data storing position register means for storing a data storing position pointer for said disc means;

memory means for storing said stride object data;

stride data storing destination register means for storing a data storing position provided for said memory means;

partial data size register means for storing a size of the partial data; and stride processing means for transferring the stride object data designated by the data storing position pointer stored in said stride data storing position register means in accordance with the data storing destination pointer stored in the stride data storing destination register means in a distributing manner in response to a data read command by using the data size stored in the partial data size register means.

14. A storage apparatus access system for use in a parallel computer system for connecting a plurality of computers to each other through a network comprising:

a first data storage means for storing stride process object data which is an object of a data distribution operation;

a stride data storing position storage means for storing a data storing position in said first data storing means;

a second data storage means for storing said stride object data;

a stride data storing destination storage means for storing a pointer designating a header of a packet to be transmitted to another computer when stride object data is included in the packet;

a partial data size storage means for storing a size of the partial data which is an object of the data distribution operation; and a stride processing means for storing the stride process object data designated by the storing content in said stride data storing position storage means in accordance with the content stored in the stride data storing destination storage means in a distributing manner by using the data size stored in the partial data size storage means.

15. A storage apparatus access system for use in a parallel computer system for connecting a plurality of computers to each other through a network comprising:

a first data storage means for storing stride process object data which is an object of a data merging operation;

a stride data storing position storage means for storing a data storing position in said first data storing means;

a second data storage means for storing said stride object data;

a stride data storing destination storage means for storing a data storing position in said second data storage means;

a partial data size storage means for storing a size of the partial data which is an object of the data merging operation; and a stride processing means for storing the stride process object data designated by the storing content in said stride data storing position storage means in accordance with the content stored in the stride data storing destination storage means in a merging manner by using the data size stored in the partial data size storage means.

16. A storage apparatus access system for use in a parallel computer system for connecting a plurality of computers to each other through a network comprising:

a first data storage means for storing stride process object data which is an object of a merging operation;

a stride data storing position storage means for storing a pointer designating a header of a packet of the object data transmitted from another data storage means;

a second data storage means for storing said stride object data;

a stride data storing destination storage means for storing a data storing position in said second data storage means;

a partial data size storage means for storing a size of the partial data which is an object of the data merging operation; and a stride processing means for storing the stride process object data designated by the storing content in said stride data storing position storage means in accordance with the content stored in the stride data storing destination storage means in a merging manner by using the data size stored in the partial data size storage means.

17. A method of accessing a storage apparatus in a parallel computer system for connecting a plurality of computers to each other through a network comprising the steps of:

storing, in a first data storage means, stride process object data which is an object of a data distribution or data merging operation;

storing, in a stride data storing position, a data storing position in said first data storing means or a pointer designating a header of a packet of the object data transmitted from another data storage means;

storing said stride object data in a second data storage means;

storing, in a stride data storing destination storage means, a data storing position in said second data storage means or a pointer designating a header of a packet to be transmitted to another computer when stride object data is included in the packet;

storing, in a partial data size storage means, a size of the partial data which is an object of the data distribution or merging operation; and storing, in a stride processing means, the stride process object data designated by the storing content in said stride data storing position storage means in accordance with the content stored in the stride data storing destination storage means in a merging or distributing manner in response to a data read or write command by using the data size stored in the partial data size storage means.

18. A method of accessing storage data in a parallel computer system, comprising the steps of:

providing at least one computer system provided with a disk apparatus;

providing at least one computer system not provided with a disk apparatus and connected to said computer provided with the disk apparatus through a network; and accessing the disk apparatus in the computer provided with the disk apparatus from the computer not provided with the disk apparatus in response to receipt of a data transfer data request or a communication message from the computer not provided with the disk apparatus, without using software resources provided in the computer provided with the disk apparatus.

19. A data access system for use in a parallel computer system including a plurality of computers interconnected through a network, one of said computers comprising:

a secondary storage for storing partial data comprising stride object data produced by a data distribution or data merging operation;

a stride data storing position register for storing a data storing position pointer for said secondary memory;

a computer memory for storing said stride object data;

a stride data storing destination register for storing a data storing destination pointer for said computer memory or a pointer designating a header of a packet to be transmitted to another computer when stride object data is included in the packet;

a partial data size register storing a data size of the partial data; and a stride processor for transferring the stride object data designated by the data storing position pointer in accordance with the data storing destination pointer from said secondary memory to said computer memory in response to a read command by using the data size stored in the partial data size register.

20. A data access system for use in a parallel computer system including a plurality of computers interconnected through a network, one of said computers comprising:

a secondary storage for storing partial data comprising stride object data produced by a data distribution or data merging operation;

a stride data storing position register for storing a data storing position pointer for said secondary memory;

a computer memory for storing said stride object data;

a stride data storing destination register for storing a data storing destination pointer for said computer memory or a pointer designating a header of a packet to be transmitted to another computer when stride object data is included in the packet;

a partial data size register storing a data size of the partial data; and a stride processor in response to a data transfer command transferring the stride object data between the secondary storage and the computer memory.

21. The data access system of claim 20, wherein the data transfer command is a read command signalling transfer of data from a hard disk to the computer memory; and wherein the stride processor in response to a read command transfers data stored in the secondary memory to the computer memory, performing a distributing operation on such data which disperses such data into a computer memory form or into a plurality of packets ready for transmission to another computer.

22. The data access system of claim 20, wherein the data transfer command is a write command signaling transfer of data from the computer memory to the hard disk; and wherein the stride processor in response to a write command transfers data stored in the computer memory stored in a distributed memory form or as a plurality of packets to the secondary memory, performing a merging operation on such data to form the data to be stored in the secondary storage.

23. A secondary storage apparatus access system for use in a parallel computer system for interconnecting a plurality of computers to each other through a network, one of said computers comprising:

memory means for storing partial data comprising stride object data which is an object of a data distribution or data merging operation;

stride data storing position register means for storing a data storing position pointer for said memory means or a pointer designating a header of a packet of the object data transmitted from another computer through the network;

secondary storage means for storing said stride object data;

stride data storing destination register means for storing a data storing distinction pointer for said secondary storage means;

partial data size register means for storing a data size of the partial data; and stride processing means for transferring the stride object data designated by a data storing position pointer in said stride data storing position register means in accordance with the destination pointer stored in the stride data storing destination register means from said memory or from another computer to said secondary storage means in a merging or distributing manner in response to a data write command by using the data size stored in the partial data size register means.

* * * * *